(12) United States Patent
Morton et al.

(10) Patent No.: US 12,100,545 B2
(45) Date of Patent: Sep. 24, 2024

(54) LINEARLY ACTUATED MAGNETIC COUPLING DEVICE

(71) Applicant: Magswitch Technology Worldwide Pty Ltd., Lafayette, CO (US)

(72) Inventors: David H. Morton, Boulder, CO (US); Paul Karp, Boulder, CO (US); Shane N. Felton, Wheat Ridge, CO (US)

(73) Assignee: Magswitch Technology, Inc., Superior, CO (US)

( * ) Notice: Subject to any disclaimer, the term of this patent is extended or adjusted under 35 U.S.C. 154(b) by 515 days.

(21) Appl. No.: 17/281,345

(22) PCT Filed: Oct. 24, 2019

(86) PCT No.: PCT/US2019/057766
§ 371 (c)(1),
(2) Date: Mar. 30, 2021

(87) PCT Pub. No.: WO2020/086791
PCT Pub. Date: Apr. 30, 2020

(65) Prior Publication Data
US 2022/0045594 A1    Feb. 10, 2022

Related U.S. Application Data

(60) Provisional application No. 62/750,082, filed on Oct. 24, 2018.

(51) Int. Cl.
*H01F 7/02* (2006.01)
*B23Q 3/154* (2006.01)
*B66C 1/04* (2006.01)

(52) U.S. Cl.
CPC ......... *H01F 7/0257* (2013.01); *B23Q 3/1546* (2013.01); *B66C 1/04* (2013.01)

(58) Field of Classification Search
CPC ............................ H01F 7/0257; B23Q 3/1546
USPC .................................................. 335/285–286
See application file for complete search history.

(56) References Cited

U.S. PATENT DOCUMENTS

| 2,475,456 | A | | 7/1949 | Norlander |
| 2,915,682 | A | | 12/1959 | Bower |
| 3,079,191 | A | * | 2/1963 | Engelsted ............. H01F 7/0257 269/8 |

(Continued)

FOREIGN PATENT DOCUMENTS

| CN | 201092045 Y | 7/2008 |
| CN | 202713101 U | 1/2013 |

(Continued)

OTHER PUBLICATIONS

International Preliminary Report on Patentability received for PCT Patent Application No. PCT/US2019/057766, mailed on May 6, 2021, 6 pages.

(Continued)

*Primary Examiner* — Alexander Talpalatski
(74) *Attorney, Agent, or Firm* — Faegre Drinker Biddle & Reath LLP

(57) ABSTRACT

The present disclosure relates to magnetic coupling devices. More specifically, the present disclosure relates to magnetic coupling devices configured to be linearly actuated and de-actuated.

27 Claims, 16 Drawing Sheets

(56) References Cited

U.S. PATENT DOCUMENTS

| | | | |
|---|---|---|---|
| 3,121,193 A * | 2/1964 | Engelsted | B23Q 3/1546 335/295 |
| 3,336,551 A * | 8/1967 | Stead | B23Q 3/1546 335/295 |
| 3,477,050 A * | 11/1969 | Hinger | H01F 7/0257 335/295 |
| 3,488,536 A | 1/1970 | Max | |
| 3,893,676 A | 7/1975 | Gloshinski et al. | |
| 4,117,793 A | 10/1978 | Preece et al. | |
| 4,166,261 A | 8/1979 | Flachenecker et al. | |
| 4,408,752 A * | 10/1983 | Uchikune | B23Q 3/1546 335/295 |
| 4,468,649 A | 8/1984 | Matsuhashi | |
| 4,837,540 A | 6/1989 | Michele et al. | |
| 5,270,678 A | 12/1993 | Gambut et al. | |
| 5,500,631 A | 3/1996 | Negus | |
| 5,818,318 A * | 10/1998 | Ligthart | B23Q 3/1546 335/295 |
| 5,993,365 A | 11/1999 | Stagnitto et al. | |
| 6,231,349 B1 | 5/2001 | Bullinger et al. | |
| 6,538,544 B1 * | 3/2003 | Hardy | B66C 1/04 335/295 |
| 7,952,455 B2 * | 5/2011 | Crawshaw | H01F 7/04 271/18.1 |
| 8,368,494 B2 * | 2/2013 | Fiedler | B62J 11/00 269/8 |
| 8,892,258 B2 | 11/2014 | Jacobsen et al. | |
| 8,917,154 B2 | 12/2014 | Fullerton et al. | |
| 9,324,487 B1 | 4/2016 | Wei et al. | |
| 9,601,955 B2 | 3/2017 | Dutau | |
| 9,613,738 B2 * | 4/2017 | Nätti | B25B 11/002 |
| 9,761,396 B2 * | 9/2017 | Nätti | H01F 7/04 |
| 10,532,791 B2 | 1/2020 | Ball | |
| 11,772,214 B2 | 10/2023 | Morton et al. | |
| 11,780,039 B2 | 10/2023 | Morton et al. | |
| 2005/0012579 A1 | 1/2005 | Underwood et al. | |
| 2006/0232367 A1 | 10/2006 | Shen | |
| 2011/0248806 A1 | 10/2011 | Michael | |
| 2012/0277911 A1 | 11/2012 | Jacobsen et al. | |
| 2013/0154389 A1 | 6/2013 | Kurs et al. | |
| 2013/0234817 A1 | 9/2013 | Kocijan | |
| 2014/0049347 A1 | 2/2014 | Barton et al. | |
| 2014/0265690 A1 | 9/2014 | Henderson | |
| 2014/0314507 A1 | 10/2014 | Timmons et al. | |
| 2014/0340182 A1 | 11/2014 | Dupraz et al. | |
| 2015/0115848 A1 | 4/2015 | McFadden | |
| 2017/0011831 A1 | 1/2017 | Nätti | |
| 2017/0372825 A1 * | 12/2017 | Rinkinen | H01F 7/04 |
| 2021/0031317 A1 | 2/2021 | Squillace et al. | |
| 2022/0001501 A1 | 1/2022 | Morton et al. | |
| 2023/0373043 A1 | 11/2023 | Morton et al. | |
| 2024/0058911 A1 | 2/2024 | Morton et al. | |

FOREIGN PATENT DOCUMENTS

| | | |
|---|---|---|
| CN | 203781619 U | 8/2014 |
| CN | 104137212 A | 11/2014 |
| DE | 19852376 A1 | 5/2000 |
| DE | 202016008504 U1 | 3/2018 |
| EP | 3100289 A1 | 12/2016 |
| GB | 190828300 A | 12/1908 |
| GB | 0152821 A | 10/1920 |
| GB | 0206130 A | 3/1924 |
| GB | 0519466 A | 3/1940 |
| GB | 1333490 A | 10/1973 |
| GB | 1335741 A | 10/1973 |
| GB | 1471025 A | 4/1977 |
| GB | 2292838 A | 3/1996 |
| GB | 2312329 A | 10/1997 |
| JP | 51-093568 U | 7/1976 |
| JP | S58-037107 U | 3/1983 |
| JP | S61-027205 U | 2/1986 |
| JP | S61-065742 A | 4/1986 |
| JP | H03-019785 A | 1/1991 |
| JP | H07-171726 A | 7/1995 |
| JP | H09-045523 A | 2/1997 |
| JP | H11-002367 A | 1/1999 |
| JP | 2002-520829 A | 7/2002 |
| JP | 2013-219364 A | 10/2013 |
| JP | 2017-509144 A | 3/2017 |
| JP | 2018-503257 A | 2/2018 |
| JP | 2021-512489 A | 5/2021 |
| KR | 20-2008-0002782 U | 7/2008 |
| KR | 10-2016-0035739 A | 4/2016 |
| KR | 10-1643538 B1 | 7/2016 |
| NL | 2009798 C | 5/2014 |
| WO | 96/07610 A1 | 3/1996 |
| WO | 2012/160262 A1 | 11/2012 |
| WO | 2015/114220 A1 | 8/2015 |
| WO | 2016/005024 A1 | 1/2016 |

OTHER PUBLICATIONS

International Search Report and Written Opinion received for PCT Patent Application No. PCT/US2019/057766, mailed on Dec. 10, 2019, 12 pages.

BMP; BMP 1800, BMP 3600; Walmag Magnetics; walmagmagnetics.com; Sep. 2017.

HSMAG; Pole Extension for Electro-Permanent Magnetic Chuck; from http://www.hsmagnets.com/producl/pole-extension-for-electro-permanent-magnetic-chuck/; Aug. 1, 2016.

Magswitch; Magswitch MLAY1000X6 Lifting Magnet Parl#8100482; from https://www.weldersupply.com/P/1496/MagswitchMLAY 1000X6Lifli; Apr. 5, 2016.

Ohio Magnetics; Steel Mill and Metal Processing Magnets; from http://www.ohiomagnetics.com/our-products/magnets-steel-mill-type; Feb. 1, 2016.

Screenshots from video—Magnetic Gripper SGM-HP and SGM-HT | Schmalz—Vacuum Technology—https://vimeo.com/187625174—Oct. 17, 2016 (15 pages).

Schmalz to present a new series of magnetic grippers at the Assembly trade show, MHI. The Industry that makes Supply Chains Work, Oct. 10, 2016 (2 pages).

Handling and clamping sheet metal gently and safely, Industrial Production, Oct. 26, 2016 (4 pages).

Assembly Instructions SCHUTZ-SGM, Dec. 2017 (1 page).

* cited by examiner

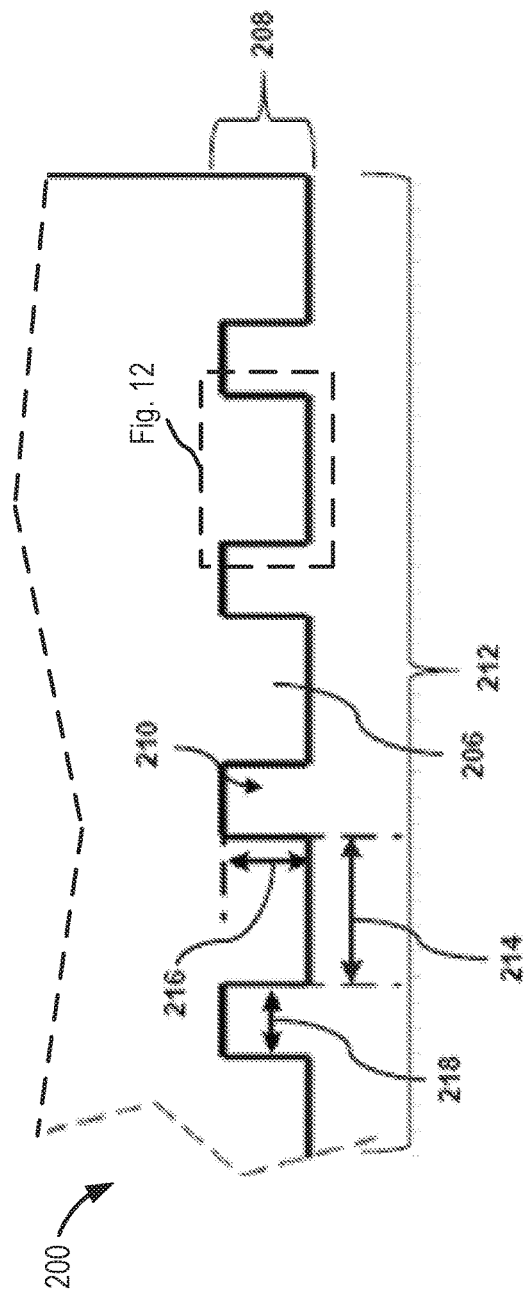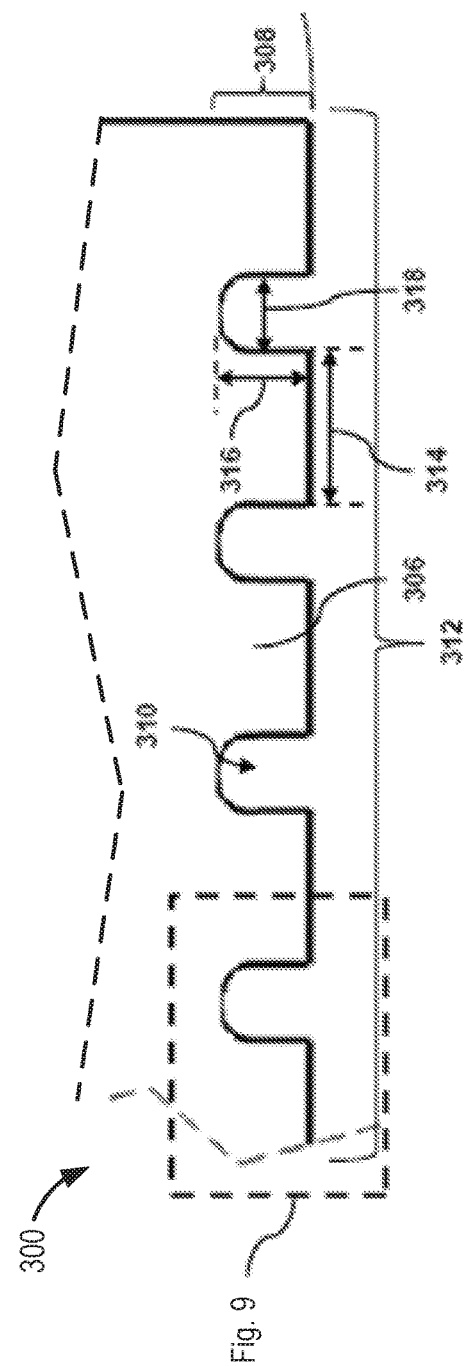
FIG. 7
FIG. 8

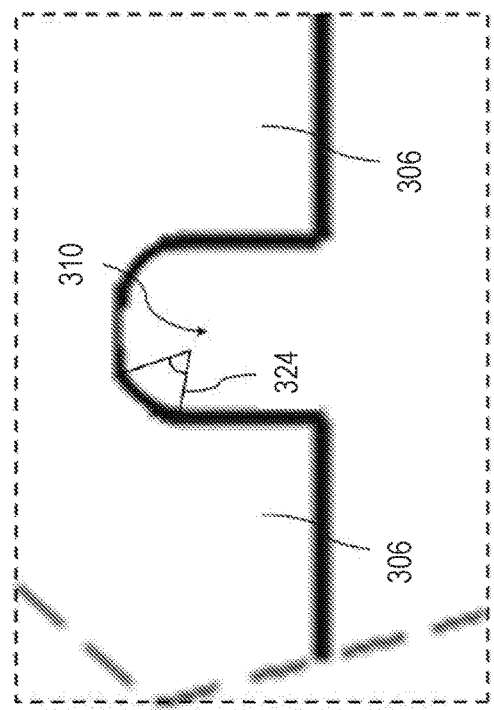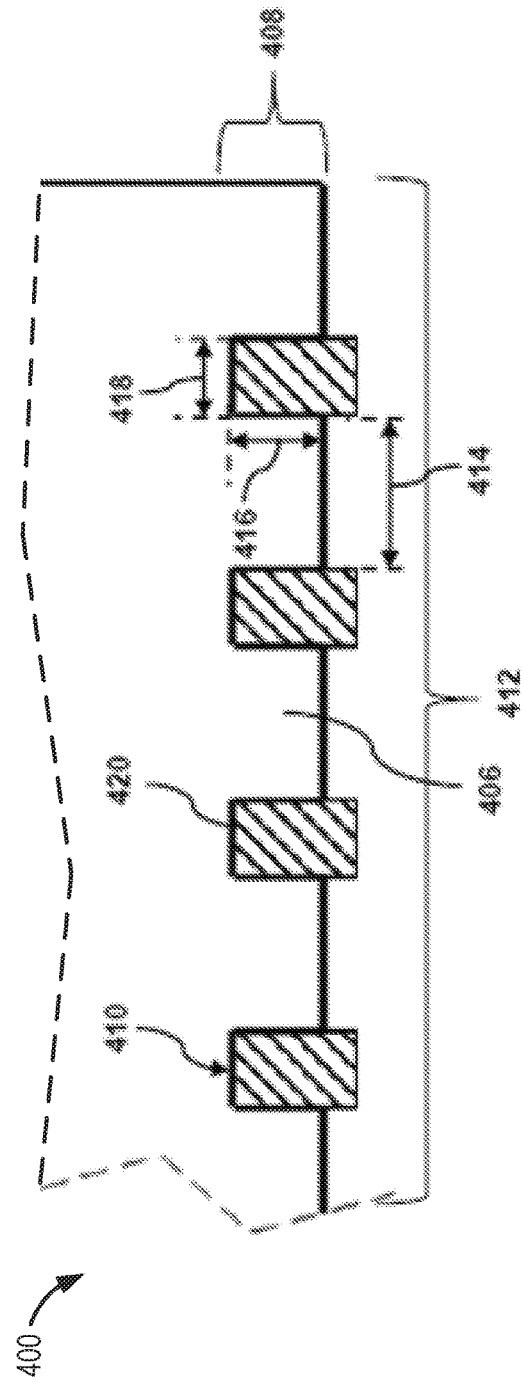

LINEARLY ACTUATED MAGNETIC COUPLING DEVICE

RELATED APPLICATIONS

This application is a national stage application of PCT International Application No. PCT/US2019/057766, filed Oct. 24, 2019, titled LINEARLY ACTUATED MAGNETIC COUPLING DEVICE, which claims the benefit of U.S. Provisional Application No. 62/750,082 filed Oct. 24, 2018, titled LINEARLY ACTUATED MAGNETIC COUPLING DEVICE, the disclosures of which are hereby expressly incorporated by reference herein in their entirety.

TECHNICAL FIELD

The present disclosure relates to magnetic coupling devices. More specifically, the present disclosure relates to magnetic coupling devices configured to be linearly actuated and de-actuated.

BACKGROUND

Magnetic coupling devices are used to couple a ferromagnetic workpiece to transport the ferromagnetic workpiece from a first location to a second location, hold the ferromagnetic workpiece, and/or lift the ferromagnetic workpiece. An exemplary magnetic coupling device is a switchable magnetic coupling device which may include a magnetic platter that is linearly translatable between an "off" position and an "on" position. When the magnetic platter is in an "on" state, the magnetic coupling device is configured to couple to a ferromagnetic workpiece to perform, for example, lifting operations, material handling, material holding, magnetically latching or coupling objects to one another, among other applications.

SUMMARY

Embodiments included herein relate to magnetic coupling devices configured to be linearly actuated and de-actuated. Embodiments include but are not limited to the following examples.

In a first example embodiment, a magnetic coupling device for magnetic coupling to a ferromagnetic workpiece, comprises: a housing having an axis extending between a first end portion of the housing and a second end portion of the housing; a ferrous piece arranged at least a first distance from the second end portion of the housing; a magnetic platter supported by the housing, the magnetic platter including a plurality of permanent magnet portions interposed between a plurality of ferromagnetic pole piece portions; and wherein the magnetic platter is linearly translatable within the housing along the axis to at least each of a first state and a second state, the magnetic platter being arranged adjacent to the ferrous piece such that the magnetic coupling device establishes a first magnetic circuit through the ferrous piece and provides a first magnetic field at a workpiece contact interface of the magnetic coupling device when the magnetic platter is in the first state and the magnetic platter being arranged spaced apart from the ferrous piece such that the magnetic coupling device provides a second magnetic field at the workpiece contact interface when the magnetic platter is in the second state, the second magnetic field being a non-zero magnetic field strength.

In a second example embodiment, a method of coupling and decoupling a magnetic coupler to a ferromagnetic workpiece comprises: contacting the ferromagnetic workpiece with a workpiece engagement interface of the magnetic coupler; moving a magnetic platter of the magnetic coupling device from a first separation from the workpiece engagement surface to a second separation from the workpiece engagement surface that is less than the first separation; moving the workpiece from a first position to a second position with the magnetic coupler; and moving the magnetic platter to a third separation from the workpiece engagement surface to decouple the magnetic coupler from the workpiece and to form a magnetic circuit through a ferrous piece within the housing, the third separation being greater than the second separation.

In a third example embodiment, a magnetic coupling device for magnetic coupling to a ferromagnetic workpiece, comprises: a housing having a passageway defining a passageway axis; a magnetic platter supported by the housing, the magnetic platter being moveable along the passageway axis between a first position and a second position, the magnetic platter including a plurality of permanent magnet portions interposed between a plurality of ferromagnetic pole piece portions; a workpiece contact interface supported by the housing and adapted to contact the ferromagnetic workpiece; and a magnetic shunt supported by the housing and magnetically accessible from the passageway, wherein with the magnetic platter is in the first position a first magnetic circuit is formed with the magnetic platter and the magnetic shunt and with the magnetic platter in the second position a second magnetic circuit is formed with the magnetic platter and the ferromagnetic workpiece through the workpiece interface.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIGS. 7-13 are exemplary portions of pole plates that can be incorporated into the magnetic coupling device of FIGS. 1A-1C.

Figure 1A:
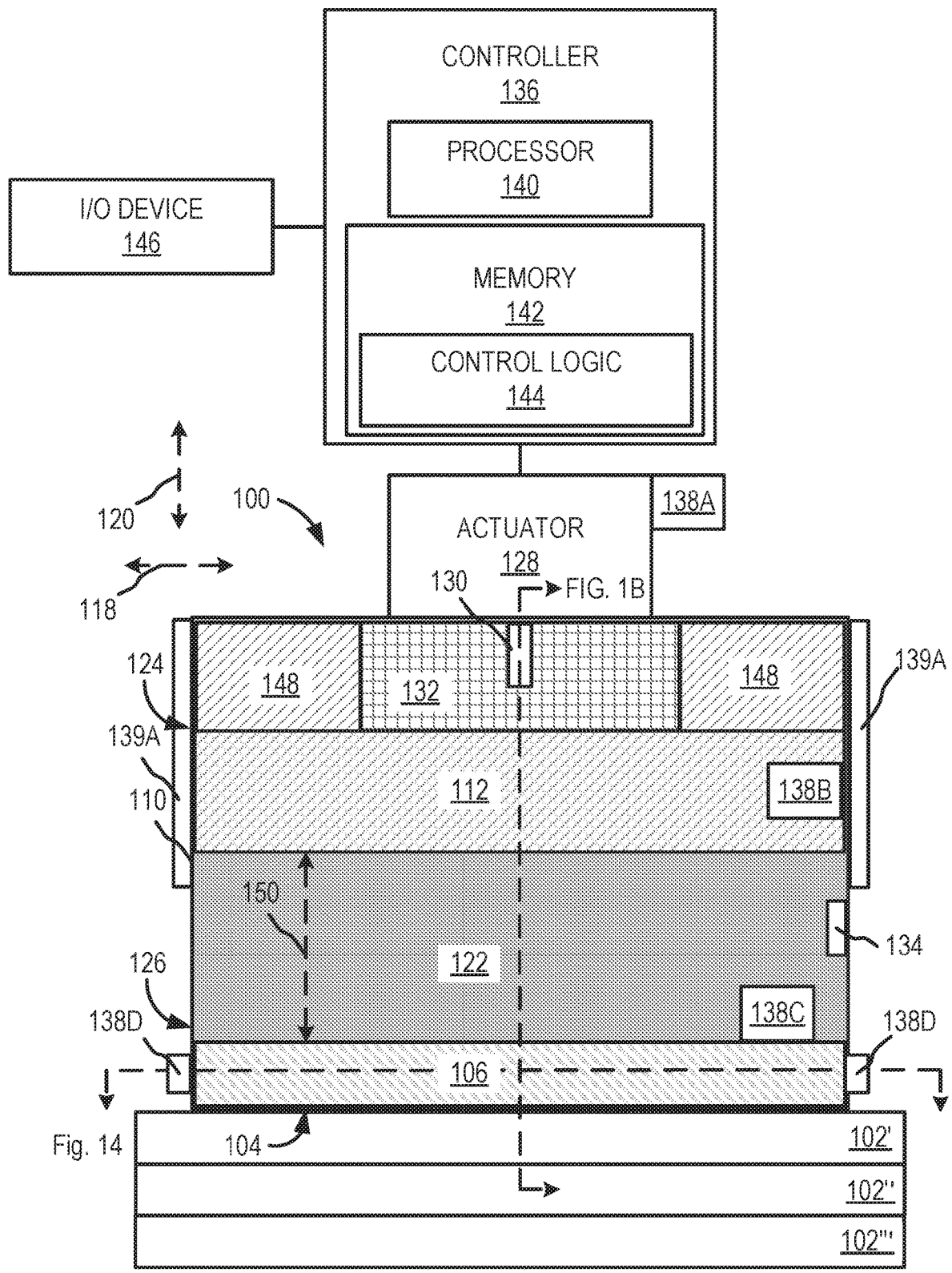
FIG. 1A illustrates a side sectional view of an exemplary magnetic coupling device in an exemplary first, off state positioned on a ferromagnetic workpiece.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

In the figures as well as in the preceding section of this specification, terms such as 'upper', 'axial' and other terms of reference are used to facilitate an understanding of the technology here described and are not to be taken as absolute and limiting reference indicators, unless the context indicates otherwise. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

Figure 1B:
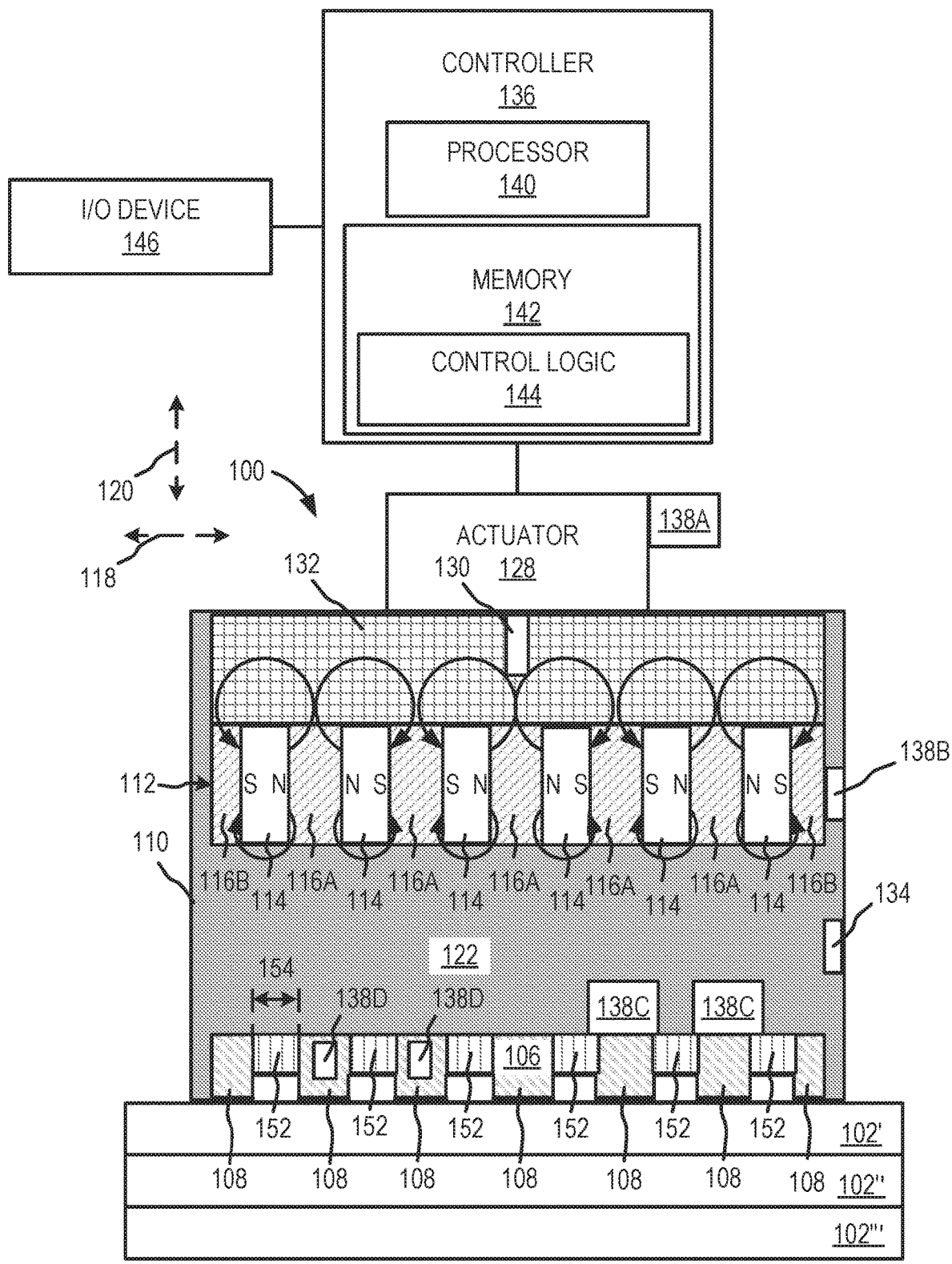
FIG. 1B illustrates a front sectional view of the magnetic coupling device of FIG. 1A.
Figure 1C:
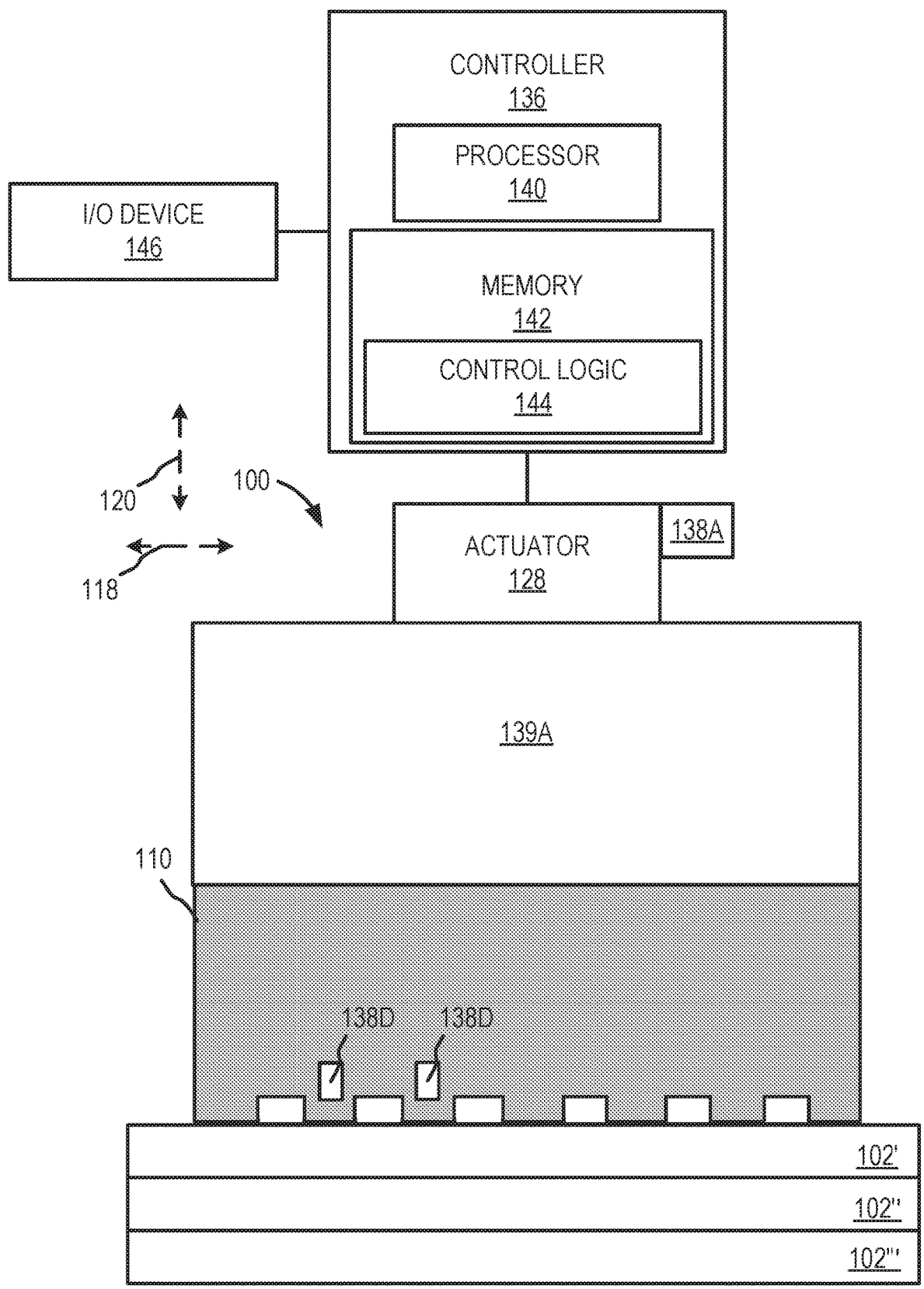
FIG. 1C illustrates a front view of the magnetic coupling device of FIG. 1A.
Figure 2:
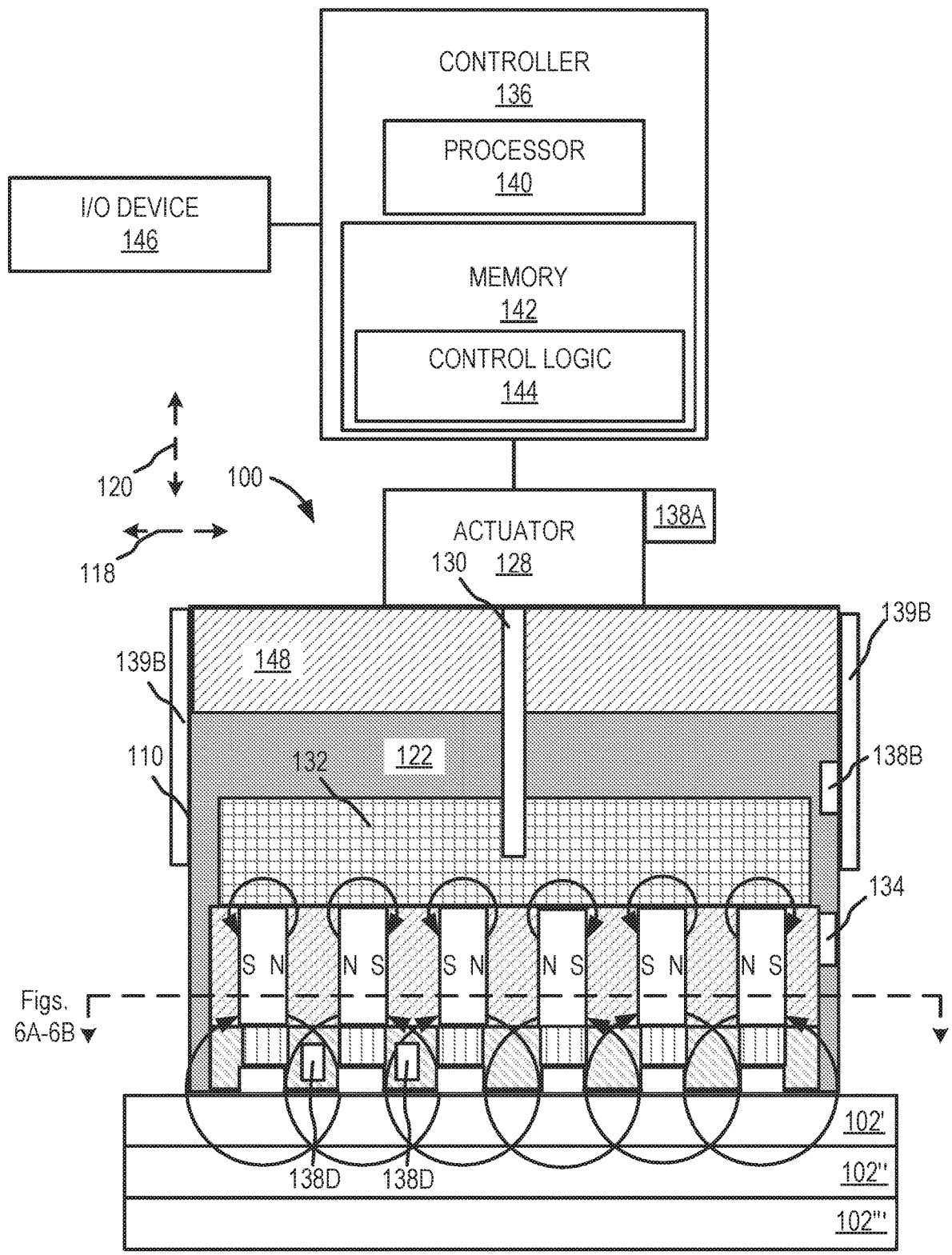
FIG. 2 illustrates a front sectional view of the magnetic coupling device of FIGS. 1A-1C in a second, on state.
Figure 3:
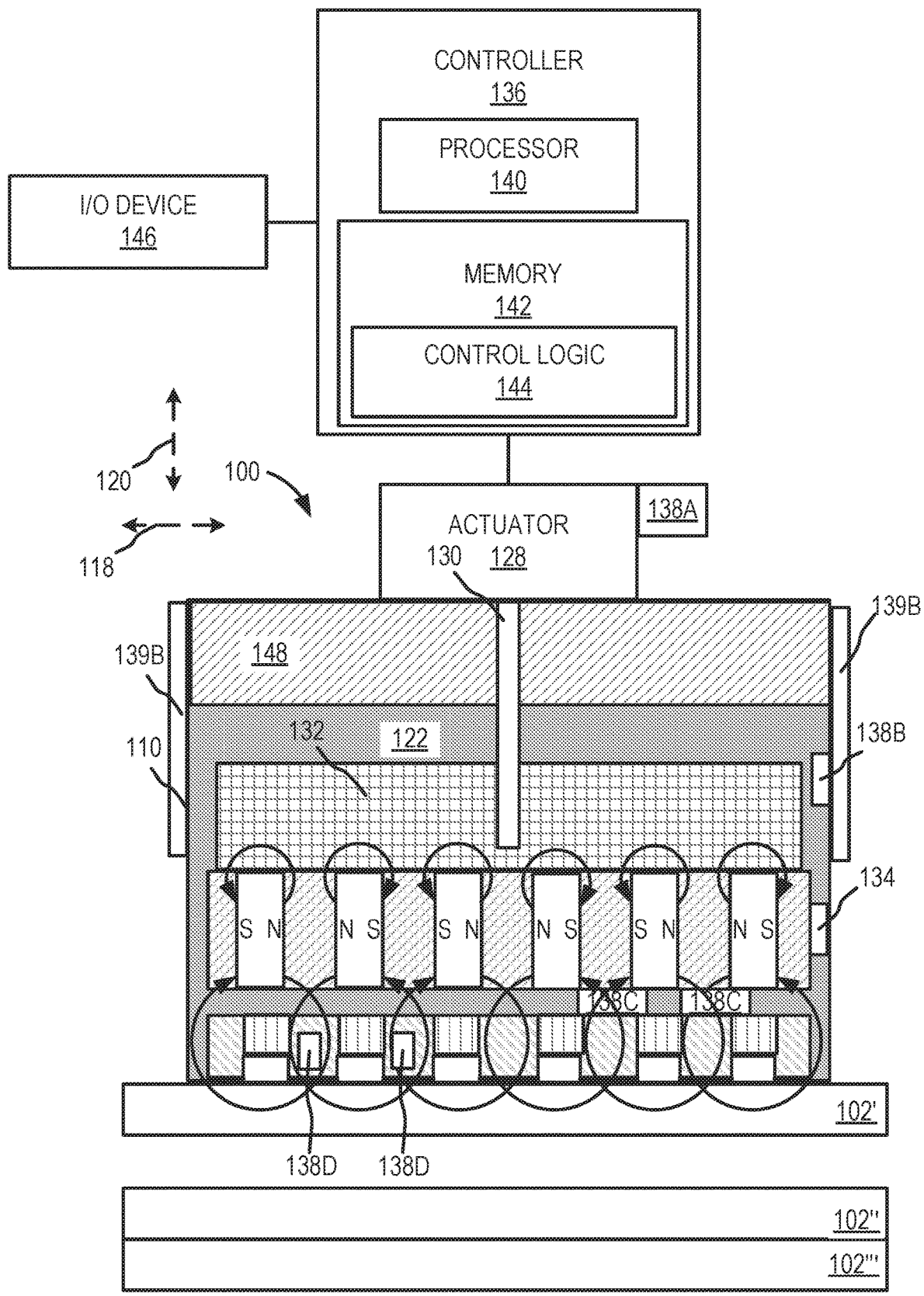
FIG. 3 illustrates a front sectional view of the magnetic coupling device of FIGS. 1A-1C in a third, on state.

FIG. 1A illustrates a side sectional view of an exemplary switchable magnetic coupling device 100 in a first, off state; FIG. 1B illustrates a front sectional view of magnetic coupling device 100; and FIG. 1C illustrates a front view of magnetic coupling device 100. FIG. 2 illustrates a front sectional view of the magnetic coupling device of FIGS. 1A-1C in a second, on state. FIG. 3 illustrates a front sectional view of the magnetic coupling device of FIGS. 1A-1C in a third, on state.

Magnetic coupling device 100 may be switched between a first, off state (depicted in FIGS. 1A-1C), a second, on state (depicted in FIG. 2), and/or a third, on state. When magnetic coupling device 100 is switched to an on state, a magnetic field produced by magnetic coupling device 100 passes through one or more ferromagnetic workpieces 102 and couples magnetic coupling device 100 to one or more of the ferromagnetic workpieces 102. When magnetic coupling device 100 is switched to an off state, magnetic field produced by magnetic coupling device 100 is primarily confined within magnetic coupling device 100 and, therefore, magnetic coupling device 100 no longer couples to one or more of the ferromagnetic workpieces 102. The off state and the on states are discussed in more detail below.

Magnetic coupling device 100 may be used as an end of arm ("EOAMT") unit for a robotic system, such as robotic system 600 (see FIG. 14), but may also be used with other lifting, transporting, and/or separating systems for ferromagnetic workpieces 102. Exemplary lifting and transporting systems include robotic systems, mechanical gantries, crane hoists and additional systems which lift and/or transport ferromagnetic workpieces 102. Additionally, magnetic coupling device 100 may also be used as part of a stationary fixture for holding at least one part for an operation, such as welding, inspection, and other operations.

Referring to FIG. 1A, magnetic coupling device 100 is positioned on top of ferromagnetic workpieces 102 and includes a workpiece contact interface 104 configured to contact and engage the ferromagnetic workpieces 102. Workpiece contact interface 104 may be a pole plate 106. In at least one embodiment, the pole plate 106 includes a plurality of spaced-apart projections 108 as illustrated in FIG. 1B. In other embodiments, the pole plate 106 does not include spaced-apart projections 108. The spaced-apart projections 108 may facilitate concentrating more magnetic flux near the workpiece contact interface 104 so that when magnetic coupling device 100 is in an on state, the magnetic flux of the magnetic coupling device 100 primarily passes through the first ferromagnetic workpiece 102'. Exemplary aspects of the pole plate 106 and the projections 108 are discussed below.

Magnetic coupling device 100 also includes a housing 110 that supports a magnetic platter 112. Magnetic platter 112 produces the magnetic field that allows magnetic coupling device 100 to couple to ferromagnetic workpieces 102 when the magnetic coupling device 100 is in an on state. In at least one embodiment, magnetic platter 112 is a laminated magnetic platter that includes a plurality of spaced-apart permanent magnet portions 114 and a plurality of pole portions 116, as shown in FIG. 1B B. Each of the plurality of spaced-apart permanent magnet portions 114 includes one or more permanent magnets. In one embodiment, each permanent magnet portion 114 includes a single permanent magnet. In another embodiment, each permanent magnet portion 114 includes a plurality of permanent magnets. Each permanent magnet portion 114 is diametrically magnetized and has a north-pole side and a south-pole side.

Each pole portion 116A is positioned between two of permanent magnet portions 114 and pole portions 116B are arranged adjacent to one permanent magnet portion 114. Further, the permanent magnet portions 114 are arranged so that each of the two permanent magnet portions 114 contacting the pole portion 116A therebetween have either their north pole sides or their south pole sides contacting the pole portion 116A. When the north-pole sides of the adjacent permanent magnet portions 114 are contacting a pole portion 116A, the pole portion 116A is referred to as a north-pole portion. When the south-pole sides of the adjacent permanent magnet portions 114 are contacting a pole portion 116A, the pole portion 116A is referred to as a south-pole portion. Similarly, for pole portions 116B, when the south-pole side of a permanent magnet portion 114 contacts the pole portion 116B, the pole portion 116B is referred to as a south-pole portion. Conversely, when the north-pole side of a permanent magnet portion 114 contacts the pole portion 116B, the pole portion 116B is referred to as a north-pole portion.

In the embodiments shown, the permanent magnet portions 114 are arranged along a horizontal axis 118. However, in other embodiments, the permanent magnet portions 114 may be arranged in a circular configuration. Furthermore, while the embodiment illustrates magnetic platter 112 including six permanent magnet portions 114 and seven pole portions 116, other embodiments may include more or fewer permanent magnet portions 114 and pole portions 116. For example, in one embodiment, magnetic platter 112 may include one permanent magnet portion 114 and two pole portions 116, where one pole portion 116 is arranged on each side of permanent magnet portion 114.

Due to the configuration of magnetic platter 112 and magnetic coupling device 100, magnetic coupling device 100 may be have a greater magnetic flux transfer to one or more of the ferromagnetic pieces 102 than conventional embodiments. This results in magnetic coupling device 100 being able to lift more and/or heavier ferromagnetic workpieces 102 per magnetic volume included in magnetic coupling device 100. For example, the magnetic coupling device 100 may have a holding force of greater than or equal to 0.35 grams of ferromagnetic workpieces 102 per cubic mm of volume of the magnetic coupling device 100. As another example, the magnetic coupling device 100 may have a holding force of greater than or equal to 0.8 grams of ferromagnetic workpieces 102 per cubic mm of volume of the housing 110 of the magnetic coupling device 100.

To switch magnetic coupling device 100 between a first, off state and a second, on state, magnetic platter 112 is linearly translatable along an axis 120 within an interior cavity 122 of the housing 104. In embodiments, the axis 120 is a vertical axis 120. Alternatively, the axis 120 is an axis other than a vertical axis. The axis 120 extends between a first end portion 124 of the housing 104 and a second end portion 126 of the housing 110. In at least some embodiments, the first end portion 124 is an upper portion of the housing 110 and the second end portion 126 is a lower portion of the housing 110 and may be referred to herein as such. However, in at least some other embodiments, the first end portion 124 is a portion of the housing 110 other than the upper portion of the housing 110 and the second end portion 126 is a portion of the housing 110 other than the lower portion of the housing 110. When magnetic platter 112 is arranged near the upper portion 124 of the housing 110, magnetic coupling device 100 is in a first, off state. When magnetic platter 112 is arranged near the lower portion 126 of the housing 110, magnetic coupling device 100 is in a second, on state. In addition to a first, off state and a second, on state, magnetic platter 112 may be arranged at one or more intermediate positions between the upper portion 124 and the lower portion 126, as shown in FIG. 3. An intermediate position may be referred to herein as a third, on state. The third, on state may produce less magnetic flux at the workpiece contact interface 104 than the second, on state, as discussed below. For example, the third, on state may result in the majority of the magnetic flux extending through only the first workpiece 102' so that only a small amount of magnetic flux extends through the second and third workpieces 102", 102'". As such, the third, on state can facilitate de-stacking workpiece 102' from the workpieces 102", 102'", as illustrated.

To translate the magnetic platter 112 along the vertical axis 120 to transition to magnetic coupling device 100 between an on state and off state and vice-versa, magnetic coupling device 100 includes an actuator 128. In at least one embodiment, actuator 128 is coupled to magnetic platter 112 via an engagement portion 130 and a non-ferromagnetic mounting plate 132. That is, actuator 128 is coupled to engagement portion 130 which is coupled to non-ferromagnetic mounting plate 132; and, non-ferromagnetic mounting plate 132 is coupled to and in contact with magnetic platter 112. Actuator 128 is configured to impart a force on engagement portion 130 and, in response, engagement portion 130 translates along vertical axis 120 to transition magnetic coupling device 100 from an off state to an on state and vice versa. That is, to transition magnetic coupling device 100 from an off state to an on state, actuator 128 imparts a downward force on engagement portion 130, which translates to non-ferromagnetic mounting plate 132 and magnetic platter 112. In response, magnetic platter 112 translates from the upper portion 124 to the lower portion 126. Conversely, to transition magnetic coupling device 100 from an on state to an off state, actuator 128 imparts an upward force on engagement portion 130, which translates to non-ferromagnetic mounting plate 132 and magnetic platter 112. In response, magnetic platter 112 and non-ferromagnetic mounting plate 132 translate from the lower portion 126 to the upper portion 124.

To arrange magnetic platter 112 at a third, on state, actuator 128 may produce a force on engagement portion 130 to translate magnetic platter 112 from the upper portion 124 to the lower portion 126 or vice versa. Then, when the magnetic platter 112 is transitioning from the upper portion 124 to the lower portion 126 or vice versa, a brake 134 arranged within housing 110 and/or within actuator 128 may engage magnetic platter 112, non-ferromagnetic mounting plate 132 and/or engagement portion 130 and stop magnetic platter 112 at a third, on state, as depicted in FIG. 3.

Figure 4:
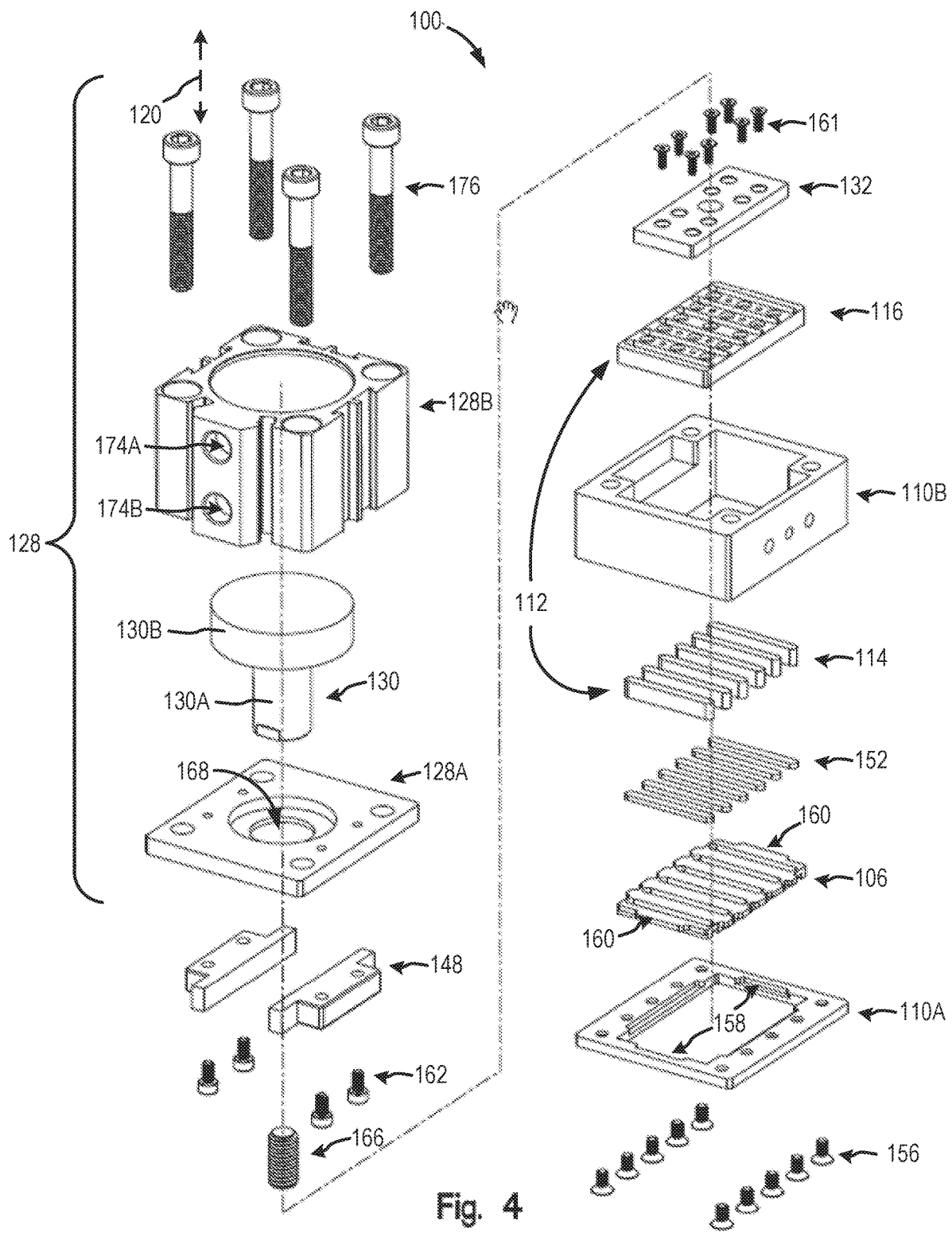
FIG. 4 illustrates an exploded view of the magnetic coupling device of FIGS. 1A-1C.

Exemplary actuators 128 include electrical actuators, pneumatic actuators, hydraulic actuators, and other suitable devices which impart a force on engagement portion 130. An exemplary pneumatic linear actuator is depicted in FIG. 4 and discussed in more detail in relation thereto. An exemplary electrical actuator is an electric motor with an "unrolled" stator and rotor coupled to the engagement portion 130. Other exemplary engagement portions and actuators are disclosed in U.S. Pat. No. 7,012,495, titled SWITCHABLE PERMANENT MAGNETIC DEVICE; U.S. Pat. No. 7,161,451, titled MODULAR PERMANENT MAGNET CHUCK; U.S. Pat. No. 8,878,639, titled MAGNET ARRAYS, U.S. Provisional Patent Application No. 62/248,804, filed Oct. 30, 2015, titled MAGNETIC COUPLING DEVICE WITH A ROTARY ACTUATION SYSTEM; and U.S. Provisional Patent Application No. 62/252,435, filed Nov. 7, 2015, titled MAGNETIC COUPLING DEVICE WITH A LINEAR ACTUATION SYSTEM, the entire disclosures of which are herein expressly incorporated by reference.

Additionally, or alternatively, actuator 128 may include a controller 136 and/or sensor 138A. Controller 136 includes a processor 140 with an associated computer readable medium, illustratively memory 142. Memory 142 includes control logic 144 which when executed by processor 140 causes electronic controller 136 to instruct actuator 128 to move magnetic platter 112 so that magnetic coupling device 100 is in an off state, second on state and/or third on state. For example, sensor 138A may sense a position of actuator 128 and, in response to a predetermined position sensed by sensor 138A, which translates to a position of magnetic platter 112, control logic 144 instructs actuator 128 to stop exerting a force on magnetic platter 112 when magnetic platter 112 reaches a desired position.

In at least one embodiment, actuator 128 is a stepper motor and rotary motion of actuator 128 is translated to linear motion of engagement portion 130 via a coupling (e.g., gear) between a shaft of actuator 128 and engagement portion 130. In these embodiments, sensor 138A counts the pulses used to drive the stepper motor and determines a position of the shaft of the stepper motor, which is translated to a position of magnetic platter 112, based on the number of pulses. That is, magnetic platter 112 is moved relative along the vertical axis 120 to a defined position by the steps the motor moves by counting the number of pulses. In another example, a stepper motor is provided that integrates an encoder with the stepper to check that the proper actuation angle is maintained.

As another example, magnetic coupling device 100 may include sensor 138B. Sensor 138B may measure the position of magnetic platter 112 within the housing 110. Exemplary sensors 138B include optical sensors which monitor reflective strips affixed to magnetic platter 112. Other sensor systems may be used to determine a position of magnetic platter 112.

As even another example, magnetic coupling device 100 may include one or more sensors 138C (illustrated in FIG. 1B). Sensors 138C may be magnetic flux sensors and positioned generally at one or more positions over pole plate 106. Exemplary magnetic flux sensors include Hall-effect sensors. Sensors 138C measure the leakage flux proximate to one or more north and south poles of pole plate 106. The amount of leakage flux at each sensor 138C varies based on the position of magnetic platter 112 relative to pole plate 106 and the amount of flux passing through the north and south poles of pole plate 106, workpiece contact interface 104 to ferromagnetic workpiece 102. By monitoring the magnetic flux at locations opposite workpiece interface 104 of north and south poles of pole plate 106, the relative position of magnetic platter 112 may be determined. In embodiments, magnetic coupling device 100 is positioned on top of ferromagnetic workpieces 102 and the magnetic fluxes measured by sensors 138C as magnetic platter 112 moves from an off state to a second, on state are recorded as a function of position of magnetic platter 112. Each of the magnetic fluxes are assigned to a desired position of magnetic platter 112. An exemplary sensing system having sensors 138C is disclosed in U.S. patent application Ser. No. 15/964,884, titled Magnetic Coupling Device with at Least One of a Sensor Arrangement and a Degauss Capability, filed Apr. 27, 2018, the entire disclosure of which is expressly incorporated by reference herein.

As even another example, magnetic coupling device 100 may include one or more sensors 138D (illustrated in FIGS. 1A, 1B, 1C, 2, and 3). Sensors 138D may be magnetic flux sensors and positioned generally adjacent the pole plate 106. Exemplary magnetic flux sensors include Hall-effect sensors. In at least one example, the sensors 138D are located adjacent to the ends of one or more of the projections 108 of the pole plate 106 and measure the leakage flux out of the sides of one or more north and south poles of pole plate 106. The amount of leakage flux at each sensor 138D varies based on the position of magnetic platter 112 relative to pole plate 106 and the amount of flux passing through the north and south poles of pole plate 106 and the workpiece contact interface 104 to the ferromagnetic workpiece 102. By monitoring the magnetic flux at locations adjacent to pole plate 106, the relative position of magnetic platter 112 may be determined. In embodiments, magnetic coupling device 100 is positioned on top of ferromagnetic workpieces 102 and the magnetic fluxes measured by sensors 138D as magnetic platter 112 moves from an off state to a second, on state are recorded as a function of position of magnetic platter 112. Each of the magnetic fluxes are assigned to a desired position of magnetic platter 112. An exemplary sensing system having sensors 138D is disclosed in U.S. patent application Ser. No. 15/964,884, titled Magnetic Coupling Device with at Least One of a Sensor Arrangement and a Degauss Capability, filed Apr. 27, 2018, the entire disclosure of which is expressly incorporated by reference herein.

In at least some embodiments, magnetic coupling device 100 includes a shielding plate 139 (illustrated in FIGS. 1A, 1B, 1C, 2, and 3). The shielding plate 139 may absorb magnetic flux from the magnetic platter 112 and reduce the external field of the magnetic coupling device 100 when the magnetic coupling device 100 is in an off position. The shielding plate 139 may be formed from a high magnetic saturation material that is capable of absorbing a high amount of magnetic flux. In one example, the shielding plate 139 is located external to the housing 110. The top edge of the shielding plate 139 may be planar with a top surface of the magnetic platter 112. Additionally, or alternatively, the shielding plate 139 may extend downward along the housing 110 so that a bottom edge of the shielding plate 139 extends past the bottom planar surface of the magnetic platter 112. The shielding plate 139 can be located on any side of the magnetic coupling device 100. In at least one example, shielding plates 139 are located on all sides of the magnetic coupling device 100. In another example, the shielding plates 139A are only located on faces of the magnetic coupling device 100 that are adjacent to the ends of the permanent magnetic portions 114, as shown in FIGS. 1A, 1C. Stated another way, the shielding plates 139A may be located on the same side(s) as the sensors 138D. In another example, the shielding plates 139B are only located on sides of the magnetic coupling device 110 that extend parallel to the projections 108, as shown in FIGS. 2 and 3.

In embodiments, the controller 136 changes the state of magnetic coupling device 100 in response to an input signal received from an I/O device 146. Exemplary input devices include buttons, switches, levers, dials, touch displays, pneumatic valves, soft keys, and communication module. Exemplary output devices include visual indicators, audio indicators, and communication module. Exemplary visual indicators include displays, lights, and other visual systems. Exemplary audio indicators include speakers and other suitable audio systems. In embodiments, device 100 includes simple visual status indicators, in the form of one or more LEDs, which are driven by the processor 140 of control logic 144, to indicate when a predefined magnetic coupling device 100 status is present or absent (e.g. Red LED on when magnetic coupling device 100 is in a first, off state, Green LED blinking fast when magnetic coupling device 100 is in a second, on state and proximity of ferromagnetic workpiece 102 is detected, Green LED slower blinking with Yellow LED on when contacting ferromagnetic workpiece 102 outside intended specific area (see discussion related to FIGS. 22-24) on ferromagnetic workpiece 102 (e.g. partially complete magnetic working circuit) and Yellow LED off with steady Green LED on, showing magnetic coupling device 100 engagement within threshold limits, showing safe magnetic coupling state.

For example, in one embodiment, magnetic coupling device 100 is coupled to an end of arm of a robotic arm and I/O device 146 is a network interface over which controller 136 receives instructions from a robot controller on when to place magnetic coupling device 100 in one of a first off-state, second on-state, or third on-state. Exemplary network interfaces include a wired network connection and an antenna for a wireless network connection. While the embodiments discussed above relate to electronic, pneumatic, or hydraulic actuation, in alternative embodiments, the magnetic coupling device 100 may be actuated manually by a human operator.

Magnetic coupling device 100 may also include one or more ferromagnetic pieces 148 arranged at or near an upper portion 124 of the housing 100, as illustrated in FIG. 1A. In at least one embodiment, non-ferromagnetic mounting plate 132 and ferromagnetic pieces 148 are arranged within housing 110 so that non-ferromagnetic mounting plate 132 is located between and in contact with ferromagnetic pieces 148 when magnetic coupling device 100 is in the first, off position. Furthermore, top portions of magnetic platter 112 may be in contact with bottom portions of ferromagnetic pieces 148. In another exemplary embodiment, the ferromagnetic pieces 148 may extend down the sides of the magnetic platter 112. In these embodiments, the ferromagnetic pieces 148 may reduce leakage of the magnetic platter 112 by providing additional absorption of the magnetic field generated by the magnetic platter 112.

In at least one embodiment, non-ferromagnetic mounting plate 132 may be made of a non-ferromagnetic material (e.g., aluminum, austenitic stainless steels, etc.). In these embodiments, when magnetic coupling device 100 is in a first, off state and magnetic platter 112 and non-ferromagnetic mounting plate 132 are positioned at or near the upper portion 118 of the housing 104, one or more circuits between the mounting platter 112, ferromagnetic pieces 148 and non-ferromagnetic mounting plate 132 is created, as illustrated in FIG. 1B. Furthermore, when magnetic coupling device 100 is in a first, off state, a gap 150 (of FIG. 1A) that comprises air and/or another substance having a low magnetic susceptibility in the interior cavity 116 is between and separates pole plate 106 and magnetic platter 112. As a result, little or no magnetic flux from the magnetic platter 112 extends to the workpiece contact interface 104 and through the ferromagnetic workpieces 102 when the magnetic coupling device 100 is in the first, off state. Therefore, magnetic coupling device 100 can be separated from ferromagnetic workpieces 102. Furthermore, most if not all of the magnetic flux from the magnetic platter 112 is contained within the housing 110 due to the circuits between the mounting platter 112, ferromagnetic pieces 148 and non-ferromagnetic mounting plate 132.

An additional advantage of including ferromagnetic pieces 148 is that the distance of the gap 150 between the bottom of magnetic platter 112 and pole plate 106 can be less than if magnetic coupling device 100 didn't include a non-ferromagnetic mounting plate 132 and ferromagnetic pieces 148. That is, one or more circuits created between magnetic platter 112, ferromagnetic pieces 148 and non-ferromagnetic mounting plate 132, facilitates confining most if not all of the magnetic flux from magnetic platter 112 within the housing 110, near the magnetic platter 112 and away from the pole plate 106. As such, the magnetic flux transferred to the ferromagnetic workpieces 102 by the magnetic coupling device 100 is insufficient to lift one or more of the ferromagnetic workpieces 102. Stated another way, the magnetic flux may be effectively zero at the bottom of the pole plate 106 and, therefore, effectively no magnetic flux is transferred to the ferromagnetic workpieces 102 by the magnetic coupling device 102, which reduces the overall required height the magnetic platter 112 needs to travel (see height 182 below) when the magnetic coupling device 102 transitions between an off state and one or more on states.

Conversely, if non-ferromagnetic mounting plate 132 and ferromagnetic pieces 148 weren't included in the magnetic coupling device 102, less of the magnetic flux from the magnetic platter 112 would be confined within housing 110 and/or near magnetic platter 112. And, because less magnetic flux would be confined near magnetic platter 112, the gap 150 between the bottom of magnetic platter 112 and pole plate 106 would have to be greater in order for the magnetic flux not to extend down through the pole plate 106 and couple magnetic coupling device 100 to one or more of the ferromagnetic workpieces 102. Due to the gap 150 being smaller in the illustrated embodiment, magnetic coupling device 100 can be smaller than other magnetic coupling devices not having these features.

As an example, the gap 150 the magnetic platter 112 may travel to transition between the first, off state to the second, on state may be less than or equal to 8 mm. Conversely, to transition from the second, on state to the first, off state, the magnetic platter 112 may travel less than or equal to 8 mm.

Another advantage of the illustrated embodiment is that less energy can be used by actuator 128 to translate magnetic platter 112 along the vertical axis 120 within the housing 110 due to the gap 150 being smaller. Even another advantage of the illustrated embodiment, is that it will be less likely magnetic platter 112 will break when actuator 128 translates magnetic platter 112 from the first, off position to the second, on position and magnetic platter 112 comes into contact with pole piece 106. This is a result of magnetic platter 112 building less momentum during the transition due to the reduced gap 150. As even another advantage of the illustrated embodiment, in the event magnetic coupling device 100 fails while magnetic coupling device 100 is in an off state, magnetic coupling device 100 will not transition to an on state due to the non-ferromagnetic mounting plate 132 and the ferromagnetic pieces 148. As such, the magnetic coupling device 100 is safer than a magnetic coupling device that transitions from an off state to an on state when the magnetic coupling device fails. Conversely, in the event magnetic coupling device 100 didn't include a non-ferromagnetic mounting plate 132 and/or ferromagnetic pieces 148, magnetic platter 112 may be more likely to transition to an on state due to the lack of magnetic circuit created in the off position.

As stated above, when the magnetic platter 106 is positioned at or near the lower portion 126 of the housing 104, magnetic coupling device 100 is in a second, on state. As illustrated in FIG. 2, magnetic flux from the magnetic platter 106 extends through one or more of the ferromagnetic workpieces 102 when the magnetic coupling device 100 is in the second, on state. As such, the magnetic coupling device 100 is configured to couple to one or more ferromagnetic workpieces 102 when the magnetic coupling device 100 is in the first, on state. While the magnetic flux lines are illustrated as passing through both ferromagnetic workpieces 102', 102", in some embodiments the magnetic flux lines primarily pass only through the ferromagnetic workpiece 102'. When the magnetic flux lines primarily pass through the first ferromagnetic workpiece 102', the magnetic coupling device 100 can be used to de-stack and separate the ferromagnetic workpieces 102 from one another.

To facilitate the magnetic flux lines primarily passing through only the first ferromagnetic workpiece 102' when magnetic coupling device 100 is in a second, on state, the magnetic platter 112 may be removable and replaceable, which allows different strength, height, and/or width magnetic platters 112 to be used with the magnetic coupling device 100. The strength, height, and/or width of the magnetic platter 112 may be selected based on the thickness of the ferromagnetic workpiece 102 so that the ferromagnetic workpieces 102 can be adequately de-stacked and separated from one another when magnetic coupling device 100 is in the second, on position.

Additionally or alternatively, the pole plate 106 may be removable and replaceable, which allows different types of pole plates 106 to be used with the magnetic coupling device 100. For example, the pole plate 106 may be selected based on the type of ferromagnetic workpiece 102 to which the magnetic coupling device 100 is being coupled. For example, the magnetic coupling device 100 may be handling class-a surfaces that cannot be scratched or marred. As a result, a pole plate 106 having rubber (or another material that reduces the likelihood the ferromagnetic workpiece 102 is scratched or marred) arranged on the workpiece contact interface may be selected and incorporated into the magnetic coupling device 100. As another example, a pole plate 106 having different projections and/or gaps may be selected based on the thickness of the ferromagnetic workpiece 102 to which the magnetic coupling device 100 is being coupled. Additional examples of the relevance of the projections and/or gaps is explained in more detail below in relation to FIGS. 7-13.

As discussed in more detail below in relation to FIG. 4, the housing 104 is configured in a manner that allows the magnetic platter 112 and/or the pole plate 106 to be easily removable and replaceable.

Additionally, or alternatively, magnetic coupling device 100 may be transition to one or more intermediate states as stated above. For example, magnetic coupling device 100 may transition to a third, on state, as illustrated in FIG. 3. The third, on state is when magnetic platter 112 is located along the vertical axis 120 between the location of the magnetic platter 112 when the magnetic coupling device 100 is in the first, off state and the location of the magnetic platter 112 when the magnetic coupling device 100 is in the second, on state. In embodiments where the same magnetic platter 112 is being used, less magnetic flux passes through the workpiece contact interface 104 and into the ferromagnetic workpieces 102 when magnetic coupling device 100 is in the third, on state than when the magnetic coupling device 100 is in the second, on state, as illustrated in FIG. 3. That is, assuming the same strength magnetic platter 112 is being used in the embodiments depicted in FIG. 2 and FIG. 3, magnetic flux lines pass through both ferromagnetic workpieces 102', 102" in FIG. 2, whereas magnetic flux lines pass through only ferromagnetic workpiece 102' in FIG. 3. By being able to be in a third, on state, magnetic coupling device 100 may be able to de-stack different thickness of ferromagnetic workpieces 102 without having to replace magnetic platter 112 with a different strength magnetic platter 112.

As stated above, the pole plate 106 includes a plurality of projections 108. Each of the projections 108 acts as a pole extension for a respective pole portion of the pole portions 116. That is, when the magnetic coupling device 100 is in a second or third, on state, the respective north or south pole of the pole portions 116 extends down through a respective projection 108. A magnetic circuit is then created that goes from a N pole portion 116 through a respective N-pole projection 108, through one or more ferromagnetic workpieces 102, through a S-pole projection 108, and through a S pole portion 116. Each permanent magnetic portion creates one of these magnetic circuits when the magnetic coupling device 100 is in an on state. As explained in more detail below in relation to FIGS. 7-13, the size of the projections 108 and the distance therebetween affect the flux transfer to the ferromagnetic workpieces 102 and allow more effective de-stacking of ferromagnetic materials 102 and an increased holding force. For example, in at least some embodiments, to achieve the highest concentration of magnetic flux being transferred through a ferromagnetic piece 102' of the ferromagnetic workpieces 102 and therefore have the greatest likelihood of being able to de-stack the ferromagnetic workpiece 102' from the ferromagnetic workpieces 102", 102''', the size of the projections (e.g., width and height) and the gap therebetween should approximately match the thickness of the ferromagnetic workpieces 102.

To separate the N and S projections 108, the pole plate 106 may include slots configured to receive one or more non-ferromagnetic pieces 152 (depicted in FIG. 1B). The non-ferromagnetic pieces 152 may be arranged within respective envelopes 154 (depicted in FIG. 1B) between each of the projections 108. Due to the non-ferromagnetic pieces 152, the magnetic circuit created by the permanent magnet portions 114 does not extend substantially through the non-ferromagnetic pieces 152 and, therefore, the N and S projections are separated from one another. Furthermore, as stated above, the projections 108 result in magnetic flux from magnetic platter 112 being nearer the workpiece contact interface 104 than if the pole plate 106 did not include a plurality of projections 108. Different aspects of the projections 108 facilitating magnetic flux from magnetic platter 112 to be concentrated nearer the workpiece contact interface 104 are discussed below in relation to FIGS. 7-13.

Referring to FIG. 4, an exploded view of the magnetic coupling device 100 is illustrated. As illustrated, the housing 110 includes a lower portion 110A releasable securable to an upper portion 110B. The lower portion 110A may be secured to the upper portion 110B using one or more screws 156. The screws 156 may provide easy access to components of magnetic coupling device 110 arranged within the housing 110, as explained below.

Prior to joining the lower portion 110A and the upper portion 110B, the lower portion 110A receives a pole plate 106. In at least one embodiment, the lower portion 110A includes recesses/cutouts 158 configured to receive tabs 160 of the pole plate 106. The tabs 160 facilitate proper positioning of the pole plate 106 within the lower portion 110A. Proper positioning of the pole plate 106 may facilitate easy replacement of the pole plate 106 in the event a pole plate 106 with different projections 108 than a currently installed pole plate 106 is desired. For example, the lower portion 110A of the housing 110 can be separated from the upper portion 110B by removing the screws 156. Then, the pole plate 106 can be removed from the lower portion 110A. After which, another pole plate 106 having different projections 108 can be inserted into the lower portion 110A so that the tabs 160 are received by the recesses/cutouts 158. Finally, the screws can 156 be used to secure the lower portion 110A to the upper portion 110A.

In addition to or in alternative to replacing the pole plate 106, the design of magnetic coupling device 100 also facilitates easy removal and replacement of magnetic platter 112. For example, as illustrated, the non-ferromagnetic mounting plate 132 is coupled to the magnetic platter 116 via one or more screws 161. After removing the lower portion 110A from the upper portion 110B, the magnetic platter 116 can be lowered along the vertical axis 120 so the screws 161 can be accessed. Once the screws 161 are unscrewed, the magnetic platter 116 can be separated from the non-ferromagnetic mounting plate 132 and exchanged for another magnetic platter 116. The new magnetic platter 116 can be secured to the non-ferromagnetic mounting plate 132 using the screws 161. After which, the lower portion 110A and the upper portion 110B can be coupled together using the screws 156.

In some instances, the magnetic platter 116 may need to be replaced in the event the magnetic platter 116 is broken or damaged. In other instances, the magnetic platter 116 may need to be replaced with a magnetic platter 116 that produces a stronger or weaker magnetic field. As discussed above, replacing the magnetic platter 116 with a magnetic platter 116 having a stronger or weaker magnetic may facilitate de-stacking the ferromagnetic workpieces 102. For example, a first magnetic platter 116 may produce enough magnetic flux through the first and second ferromagnetic workpieces 102', 102" to lift both ferromagnetic workpieces 102', 102". However, separating the first ferromagnetic workpiece 102' from the second ferromagnetic workpiece 102" may be desirable. In these instances, a second magnetic platter 116 that is weaker than the first magnetic platter 116 and only produce enough magnetic flux through the ferromagnetic workpieces 102 to lift the first ferromagnetic workpiece 102' may replace the first magnetic platter 116.

In the illustrated embodiment, a lower portion 128A of the actuator 128 is coupled to the housing 110 using one or more screws 162. As such, the lower portion 128A acts as a cover to the housing 110. Further, ferromagnetic pieces 148 are coupled to a bottom portion 128A of the actuator 128 using the one or more screws 162. As such, when the magnetic platter 112 and non-ferromagnetic mounting plate 132 are moved to an upper portion of the housing 110 and magnetic coupling device 100 is in the first, off position, magnetic platter 112 and non-ferromagnetic mounting plate 132 are arranged near and/or in contact with the ferromagnetic pieces 148. Magnetic circuits are then formed from N pole portions 116 of the magnetic platter 112 through one of the ferromagnetic workpieces 148, through the non-ferromagnetic mounting plate 132, through the other ferromagnetic workpiece 148 and to S pole portions 116 of the magnetic platter 112. The circuit results in a number of advantages for the magnetic coupling device 100, which are discussed above.

As illustrated, non-ferromagnetic mounting plate 132 is coupled to the engagement portion 130 with a screw 166. The engagement portion 130 includes a first portion 130A and a second portion 130B, wherein in at least some embodiments, the first portion 130A has a smaller cross-sectional area than the second portion 130B. In at least one embodiment, the first portion 130A extends through a conduit 168 in the bottom portion 128A and coupled to the non-ferromagnetic mounting plate 132 via the screw 166. Due to the coupling of the engagement portion 130 to the non-ferromagnetic mounting plate 132, translation of the engagement portion 130 along the vertical axis 120 will translate the non-ferromagnetic mounting plate 132 and magnetic platter 112 along the vertical axis 120.

To translate the engagement portion 130 along the vertical axis 120, the actuator 128 may be pneumatically actuated. For example, the actuator's housing 128B may include ports 174 including a first port 174A and a second port 174B. When air is provided into port 174A, via an air compressor or otherwise, the pressure within the actuator's housing 128B and above the second portion 130B increases, which results in the engagement portion 130 moving downward along the vertical axis 120. The translation of the engagement portion 130 results in the magnetic platter 112 moving downward along the vertical axis 120 so the magnetic coupling device 100 is transitioned from a first, off state to a second, on state or a third, on state or from a third, on state to a second, on state. To confine air provided into port 174A within the actuator's housing 128B and above engagement portion 130, actuator 128 may include a cover (not shown) secured to the actuator's housing 128B via one or more screws 176. Additionally, or alternatively, air may be withdrawn from port 174B in order to reduce the pressure below the second portion 130B relative to the pressure above the second portion 130B, which results in the engagement portion 130 moving downward along the vertical axis 120.

Conversely, when air is provided into the port 174B, the pressure within the actuator's housing 128B and below the second portion 130B increases, which results in the plate moving upward along the vertical axis 120. The translation of the engagement portion 130 results in the magnetic platter 112 moving upward along the vertical axis 120 so the magnetic coupling device 100 is transitioned from a second, on state to a third, on state or a first, off state or from a third, on state to a first, off state. Additionally, or alternatively, air may be withdrawn from port 174A in order to reduce the pressure above the second portion 130B relative to the pressure below the second portion 130B, which results in the engagement portion 130 moving upward along the vertical axis 120.

In at least some other embodiments, the ports 174A, 174B may be formed through the housing 110B and pressure or a reduction in pressure may be applied to the top of the magnetic platter 112 or the bottom of the magnetic 112 to translate the magnetic platter 112 along the vertical axis 120.

Figure 5:
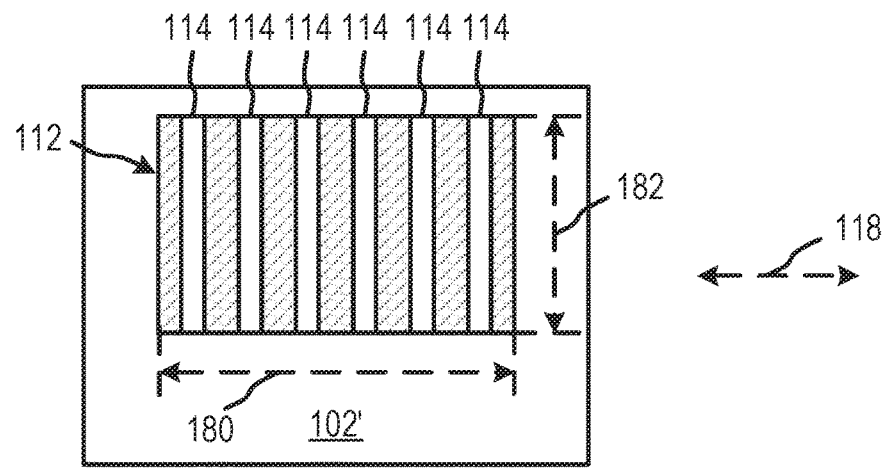
FIG. 5 illustrates a top sectional view of the magnetic coupling device of FIGS. 1A-1C in a first position on a ferromagnetic workpiece.
Figure 6:
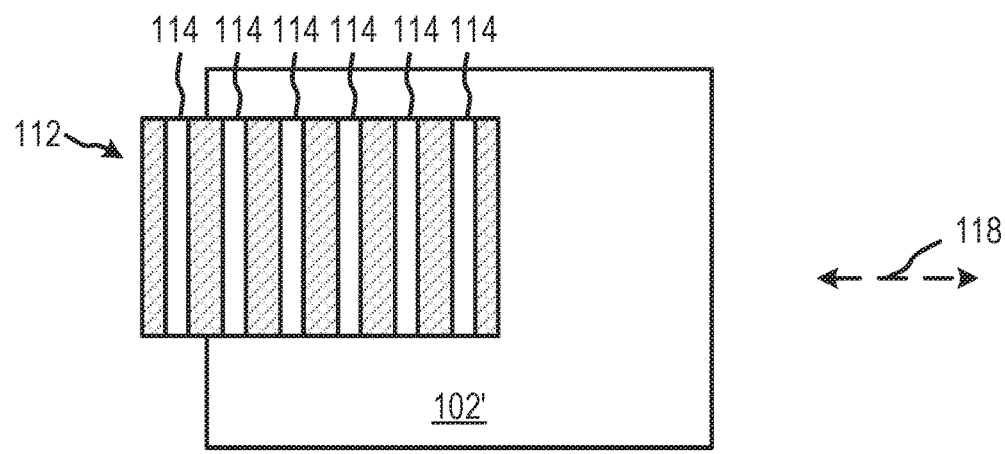
FIG. 6 illustrates a top sectional view of the magnetic coupling device of FIGS. 1A-1C in a second position on a ferromagnetic workpiece.

FIGS. 5 and 6 illustrate a top sectional view of the magnetic coupling device of FIGS. 1A-1B in different positions on a ferromagnetic workpiece 102. Referring to FIG. 5, the magnetic platter 112 is shown on ferromagnetic workpiece 102'. As illustrated, the entirety of the footprint of the magnetic platter 112 has been placed on ferromagnetic workpiece 102'. As used herein, the term footprint may be defined as the surface area of the magnetic platter 112, i.e., the width 180 times the height 182. It is preferable to have the entire footprint of the magnetic platter 112 to be placed on the ferromagnetic workpiece 102' because the most amount of flux will be transferred from magnetic platter 112 to ferromagnetic workpiece 102'. When the entire footprint of the magnetic platter 112 is placed on ferromagnetic workpiece 102', magnetic coupling device 100 may be configured to lift greater than or equal to 22.0 grams of ferromagnetic workpieces 102 per square mm of area of footprint of the magnetic platter 112.

While it is preferable to have the entire footprint of the magnetic platter 112 places on the ferromagnetic workpiece 102', oftentimes magnetic platter 112 will be placed on ferromagnetic workpiece 102' as shown in FIG. 6. This can occur when magnetic coupling device 100 is attached to an end of arm unit for a robotic system, such as robotic system 600 (of FIG. 14), where placement of magnetic platter 112 on ferromagnetic workpiece 102' is being performed using a determined position of the magnetic coupling device 100, computer vision, and/or some other automated process.

In the event magnetic platter 112 is placed on ferromagnetic workpiece 102' as shown in FIG. 6, the configuration of magnetic platter 112 may offer some advantages. Specifically, there may be a lower likelihood magnetic platter 112 will peel away from ferromagnetic workpiece 102' when magnetic platter 112 lifts ferromagnetic workpiece 102' compared to other magnetic coupling devices. That is, due to multiple permanent magnetic portions 114 being included in the magnetic platter 112, when the magnetic platter 112 is placed on ferromagnetic workpiece 102' as shown in FIG. 6, only the left most permanent magnetic portion 114 is off of ferromagnetic workpiece 102'. Therefore, five other magnetic circuits are still formed between the magnetic platter 112 and the ferromagnetic workpiece 102'. As such, the magnetic platter 112 may still be operating at approximately an 83% capacity (⅚=0.83). Comparatively, if the magnetic platter 112 only included one permanent magnetic portion 114, one-third of the magnetic circuit wouldn't be formed with the ferromagnetic workpiece 102' due to ⅓ of the pole portion being off the ferromagnetic workpiece 102'. As such, magnetic platter 112 may be operating at approximately 66% capacity. As another example, in the event a magnetic platter had a circular footprint that included one or more north poles and one or more south poles, and the magnetic platter were only placed partially on the ferromagnetic workpiece 102, a large portion of one of the poles or multiple poles would be off the ferromagnetic workpiece 102 thereby significantly reducing the holding force of the magnetic platter.

As stated above, pole plate 106 may have spaced-apart projections 108. Referring to FIGS. 7-13 are exemplary portions of pole plates 106 and projections 108 that can be incorporated into the magnetic coupling device of FIGS. 1A-1C.

FIG. 7 is a side view of a portion of an exemplary portion of a pole plate 200 which can be used as the pole plate 106. Pole plate 200 includes a plurality of projections 206 arranged on a bottom portion 208 of pole plate 200. Each of projections 206 are separated by recess portions 210. Additionally, the plurality of projections 206 collectively form a workpiece contact interface 212 of pole plate 200.

Due to the plurality of projections 206 included in pole plate 200, a magnetic coupling device including pole plate 200 produces a stronger magnetic field near workpiece contact interface 212 than a magnetic coupling device including a pole plate that does not include the projections 206. The magnetic field produced near workpiece contact interface 212 may be referred to herein as the shallow magnetic field. Furthermore, by including the plurality of projections 206 on pole plate 200, a magnetic coupling device including pole plate 200 produces a weaker magnetic field farther away in depth from pole plate 200 than a magnetic coupling device that does not include the projections 206. The magnetic field produced farther away from the pole plate 200 may be referred to herein as a far-field or deep magnetic field produced by pole plate 200. Stated another way, a magnetic coupling device including pole plate 200 having projections 206 has a stronger holding force near workpiece contact interface 212 than a magnetic coupling device including a pole plate with a flush continuous interface that doesn't include projections 206.

As a result of the projections 206 of pole plate 200 facilitating producing a stronger shallow magnetic field and a weaker far-field magnetic field, the magnetic coupling device including pole plate 200 may be used to de-stack thin ferromagnetic workpieces 102 better than a magnetic coupling device having pole plate without the projections 206. That is, a magnetic coupling device including a pole plate that doesn't have the projections 206 may produce a stronger far-field magnetic field that will result in multiple thin ferromagnetic workpieces 102 being coupled to the magnetic coupling device. When trying to obtain a single thin ferromagnetic workpiece 102 from a stacked array of thin ferromagnetic workpieces 102, this is an undesirable result. As such, instead of using a magnetic coupling device including pole plate without the projections 206 to de-stack ferromagnetic workpieces 102, a pole plate 200 including the projections 206 may be used.

In embodiments, varying the widths 214 of the projections 206 result in different shallow magnetic fields produced by the same magnetic coupling device. For example, as the width 214 of the magnetic projections 206 increases, the shallow magnetic field decreases and the far-field magnetic field increases. As such, to produce a preferred shallow magnetic field for a specific ferromagnetic workpiece 102, the widths 214 of the projections 206 may have a width within approximately +/−25% the thickness of the ferromagnetic workpiece 102 to be de-stacked. For example, when a magnetic coupling device is de-stacking 2 mm thick ferromagnetic workpieces 102, the widths 214 of the projections 206 could be approximately 2 mm (e.g., 2 mm+/−25%). In embodiments, this will produce a strong shallow magnetic field between 0 mm and 2 mm depth from workpiece contact interface 212. In at least one embodiment, however, there may be a limit for producing a preferred shallow magnetic field for some ferromagnetic workpieces 102 having thicknesses less than the limit. That is, for ferromagnetic workpieces 102 having a thickness less than X mm, a preferred shallow magnetic field may be produced by projections 206 having widths 214 that are at a lower limit of X mm but are not less than the lower limit. That is, to produce a preferred magnetic field for a workpiece 102 having a thickness of ½*X mm, the widths 214 of the projections 206 may be at the lower limit of X mm instead of +/−25% of ½*X mm. If, however, the thickness of the ferromagnetic workpiece 102 is X mm or more, then the widths 214 may approximately equal (e.g., +/−25%) the thickness of the ferromagnetic workpieces 102. Examples of a lower limit may be in the range of 0 mm to 2 mm. However, this is only an example and not meant to be limiting.

In at least one embodiment, when a magnetic coupling device including a pole plate 200 is coupling to ferromagnetic workpieces 102 having different thicknesses, a pole plate 200 having widths 214 that is an average of the thickness of the ferromagnetic workpieces 102 may be used to reduce the need to change pole plates. Similar to above, however, a lower limit (e.g., 2.0 mm) may be applied such that if the average thickness of the ferromagnetic workpieces 102 is below the lower limit (i.e., <2.0 mm), the widths 214 may be configured to be the lower limit (i.e., 2.0 mm).

In embodiments, varying the depths 216 and/or widths 218 of the recesses 210 result in different shallow magnetic fields produced by the same magnetic coupling device 100. In embodiments, to produce an appropriate shallow magnetic field for a specific ferromagnetic workpiece 102, the depths 216 and/or widths 218 of the recesses 210 could be approximately the same (e.g., +/−25%) as the widths 214 of the projections 206. For example, if the widths 214 of the projections 206 are 2 mm, then the depths 216 and/or widths 218 of the recesses 210 could be approximately 2 mm (e.g., 2 mm+/−25%). In embodiments, this will produce a strong shallow magnetic field between 0 mm and 2 mm depth from contact interface 212. Similar to above, however, there may be a limit for producing a preferred shallow magnetic field for some ferromagnetic workpieces 102 having thicknesses less than the limit. That is, for ferromagnetic workpieces 102 having a thickness less than X mm, a preferred shallow magnetic field may be produced by depths 216 and widths 218 that are at a lower limit of X mm but are not less than the lower limit. That is, to produce a preferred magnetic field for a ferromagnetic workpiece 102 having a thickness of ½*X mm, the depths 216 and widths 218 may be at the lower limit of X mm instead of +/−25% of ½*X mm. If, however, the thickness of the ferromagnetic workpiece 102 is X mm or more, then the depths 216 and widths 218 may approximately equal (e.g., +/−25%) the thickness of the ferromagnetic workpiece 102.

Similar to above, when a magnetic coupling device 100 including pole plate 200 is coupling ferromagnetic workpieces 102 having different thicknesses, a pole plate 200 having depths 216 and/or widths 218 of recesses 210 that is an average of the thickness of the ferromagnetic workpieces 102 may be used to reduce the need to change pole plates. Moreover, a lower limit (e.g., 2.0 mm) may be applied such that if the average thickness of the ferromagnetic workpieces 102 is below the lower limit (i.e., <2.0 mm), the depths 216 and widths 218 may be configured to be the lower limit (i.e., 2.0 mm).

Pole plate 200 may be releasably coupled to the magnetic coupling device 100. Therefore, when projections 206 of the pole plate 200 do not have the appropriate widths 214, depths 216 and/or widths 218 for the ferromagnetic workpiece 102 to which magnetic coupling device 100 is coupling, pole plate 200 may be replaced by a more appropriate pole plate 200.

FIG. 8 is a side view of a portion of another exemplary portion of a pole plate 300 which can be used as the pole plate 106. Similar to pole plate 200 depicted in FIG. 7, pole plate 300 includes a plurality of projections 306 arranged on a bottom portion 308 of the pole plate 300. Each of projections 306 are separated by a recess portion 310. The plurality of projections 306 collectively form a workpiece contact interface 312 of pole plate 300.

Similar to above, varying the widths 314 of the projections 306 and/or the depths 316, and/or widths 318 of the recesses 310 result in different shallow magnetic fields produced by the same magnetic coupling device 100. In embodiments, to produce an appropriate shallow magnetic field for a specific ferromagnetic workpiece 102, the widths 314 of the projections and/or the depths 316, and/or widths 318 of the recesses 310 could be approximately the same (e.g., +/−25%) as the thickness of the ferromagnetic workpiece 102 to be coupled to magnetic coupling device 100. In at least one embodiment, however, there may be a limit for producing a preferred shallow magnetic field for some ferromagnetic workpieces 102 having thicknesses less than the limit. That is, for ferromagnetic workpieces 102 having a thickness less than X mm, a preferred shallow magnetic field may be produced by widths 314, depths 316, and/or widths 318 that are at a lower limit of X mm but are not less than the lower limit. That is, to produce a preferred magnetic field for a ferromagnetic workpiece 102 having a thickness of ½*X mm, the widths 314, depths 316, and/or widths 318 may be at the lower limit of X mm instead of +/−25% of ½*X mm. If, however, the thickness of the ferromagnetic workpiece 102 is X mm or more, then the widths 314, depths 316, and/or widths 318 may approximately equal (e.g., +/−25%) the thickness of the ferromagnetic workpiece 102.

Examples of a lower limit may be in the range of 0 mm to 2 mm. However, this is only an example and not meant to be limiting.

Alternatively, when a magnetic coupling device including the pole plate 300 is coupling to ferromagnetic workpieces 102 having different thicknesses, a pole plate 300 having widths 314, depths 316, and/or widths 318 that is about an average of the thickness of the ferromagnetic workpieces 102 may be used to reduce the need to change pole plates. Similar to above, however, a lower limit (e.g., 2.0 mm) may be applied such that if the average thickness of the ferromagnetic workpieces 102 is below the lower limit (i.e., <2.0 mm), the widths 314, depths 316, and/or widths 318 may be configured to be the lower limit (i.e., 2.0 mm).

Referring to FIG. 9, the recess portions 310 between the projections 306 may have a continuous slope profile (the slope is defined at all points, no sharp corners) at their upper extremes. Curved recess portions 310 may have a higher magnetic flux transfer to a ferromagnetic workpiece 102 than a magnetic coupling device including a pole plate that includes recessed portions with sharp corners. In embodiments, to provide a high magnetic flux transfer, the radius of curvature 324 of the curved recess portions 310 may be approximately ½ the width 318 of the recesses 310. Test data has indicated an improvement greater than 3% may be obtained by including a slope profile of the recess portions 310 that is ½ the width 318 of the recesses 324.

FIG. 10 is a side view of a portion of another exemplary pole plate 400 which can be used as the pole plate 106. Similar to pole plates 200, 300 depicted in FIGS. 6 and 7, respectively, pole plate 400 includes a plurality of projections 406 arranged on a bottom portion 408 of pole plate 400. Each of the projections 406 are separated by recess portions 410. The plurality of projections 406 collectively form a workpiece contact interface 412 of pole plate 400.

Similar to above, varying the widths 414 of the projections 406 and/or the depths 416, and/or widths 418 of the recesses 410 result in different shallow magnetic fields produced by the same magnetic coupling device 100. In embodiments, to produce an appropriate shallow magnetic field for a specific ferromagnetic workpiece 102, the widths 414 of the projections 406 and/or the depths 416, and/or widths 418 of the recesses 410 could be approximately the same (e.g., +/−25%) as the thickness of the ferromagnetic workpiece 102. In at least one embodiment, however, there may be a limit for producing a preferred shallow magnetic field for some ferromagnetic workpieces 102 having thicknesses less than the limit. That is, for ferromagnetic workpieces 102 having a thickness less than X mm, a preferred shallow magnetic field may be produced by widths 414, depths 416, and/or widths 418 that are at a lower limit of X mm but are not less than the lower limit. That is, to produce a preferred magnetic field for a ferromagnetic workpiece 102 having a thickness of ½*X mm, the widths 414, depths 416, and/or widths 418 may be at the lower limit of X mm instead of +/−25% of ½*X mm. If, however, the thickness of the ferromagnetic workpiece 102 is X mm or more, then the widths 414, depths 416, and/or widths 418 may approximately equal (e.g., +/−25%) the thickness of the ferromagnetic workpiece 102. Examples of a lower limit may be in the range of 0 mm to 2 mm. However, this is only an example and not meant to be limiting.

Alternatively, when a magnetic coupling device including pole plate 400 is coupling to ferromagnetic workpieces 102 having different thicknesses, a pole plate 400 having widths 414, depths 416, and/or widths 418 that is an average of the thickness of the ferromagnetic workpieces 102 may be used to reduce the need to change pole plates. Similar to above, however, a lower limit (e.g., 2.0 mm) may be applied such that if the average thickness of the ferromagnetic workpieces 102 is below the lower limit (i.e., <2.0 mm), the widths 414, depths 416, and/or widths 418 may be configured to be the lower limit (i.e., 2.0 mm).

In embodiments, pole plate 400 may also include compressible members 420 arranged between projections 406 in the recessed portions 410. In embodiments, the compressible members 420 compresses when magnetic coupling device 100 including the pole plate 400 couples to a ferromagnetic workpiece 102. Due to the compression of compressible members 420, static friction between compressible members 420 and the ferromagnetic workpiece 102 is created that is potentially greater than the static friction between the projections 406 and the ferromagnetic workpiece 102. As such, a ferromagnetic workpiece 102 coupled to a magnetic coupling device 100 including the pole plate 400 may be less like to rotate and translate than if the ferromagnetic workpiece 102 was coupled to a pole plate that didn't include the compressible members 420. In embodiments, compressible members 420 may be comprised of an elastic material such as polymers of isoprene, polyurethane, nitrile rubber and/or the like.

Figure 11B:
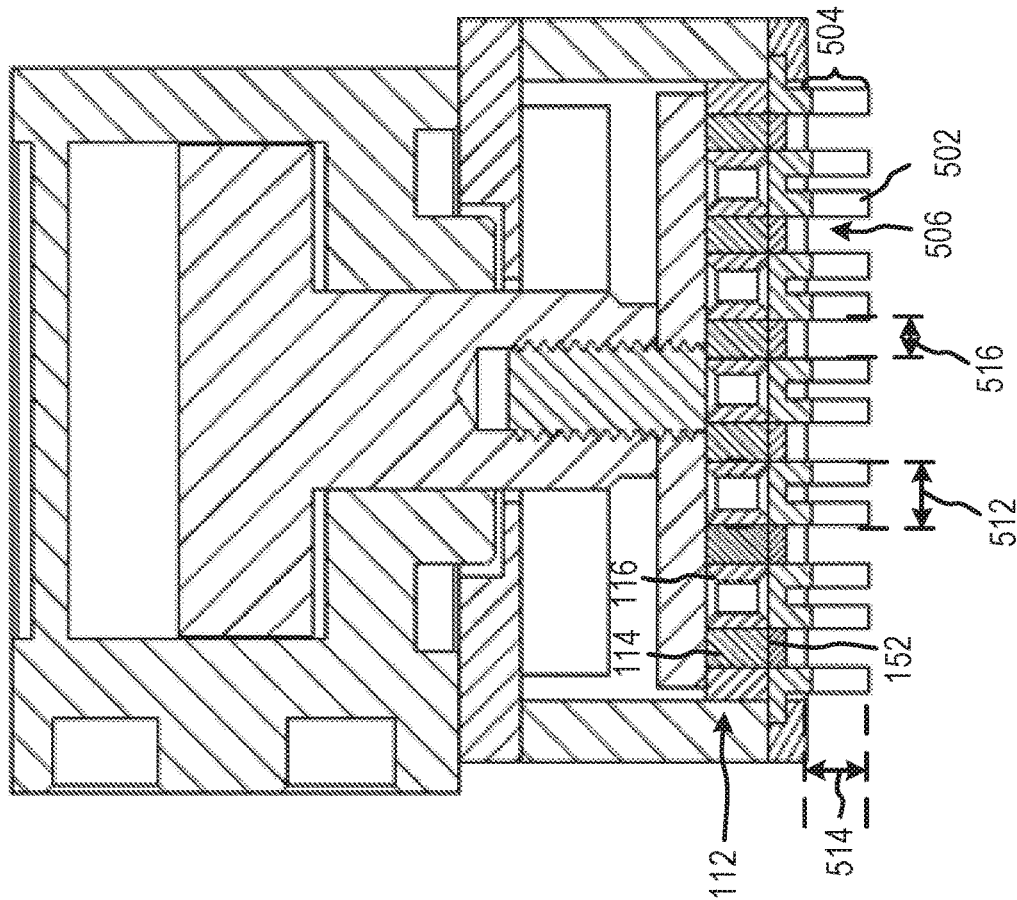
Figure 11A:
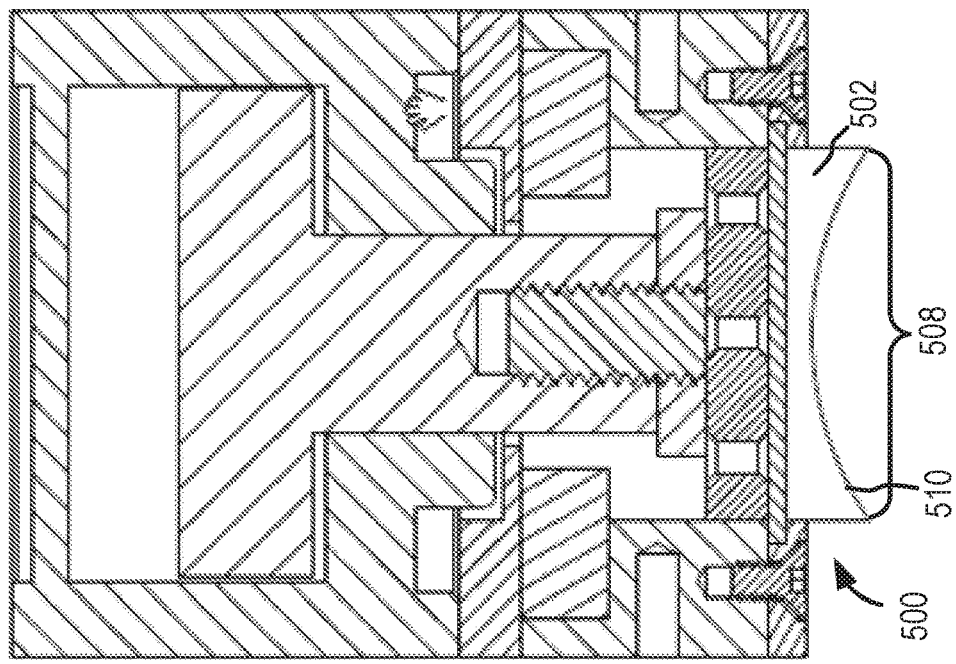

FIGS. 11A-11B depict another exemplary pole plate 500 which can be used as the pole plate 106. Similar to the pole plates 200, 300, 400 depicted in FIGS. 7, 8, 10 pole plate 500 includes a plurality of projections 502 arranged on a bottom portion 504 of pole plate 500. Each of projections 502 are separated by recess portions 506. The plurality of projections 502 collectively form a workpiece contact interface 508 of the pole plate 500.

As illustrated, the workpiece contact interface 508 is non-planar. In embodiments, the non-planar workpiece contact interface 508 may facilitate coupling a magnetic coupling device 100 to a ferromagnetic workpiece having a non-planar surface. For example, a magnetic coupling device 100 including pole plate 500 may be used for coupling magnetic coupling device 100 to one or more types of rods, shafts, etc. (e.g., a cam shaft). While the workpiece contact interface 508 includes a curved surface 510, the workpiece contact interface 508 may have any other type of non-planar surface. For example, the workpiece contact interface 508 may include a similar contour as a ferromagnetic piece to which the magnetic coupling device including the workpiece contact interfaces 508 is intended to couple.

Despite having a non-planar workpiece contact interface 508, varying the widths 512 of the projections 502 and/or the depths 514, and/or widths 516 of the recesses 506 result in different shallow magnetic fields produced by the same magnetic coupling device. In embodiments, to produce an appropriate shallow magnetic field for a specific ferromagnetic workpiece 102, the widths 512 of the projections 552 and/or the depths 514, and/or widths 516 of the recesses 506 could be approximately the same (e.g., +/−25%) as the thickness of the ferromagnetic workpiece 102. In at least one embodiment, however, there may be a limit for producing a preferred shallow magnetic field for some ferromagnetic workpieces 102 having thicknesses less than the limit. That is, for ferromagnetic workpieces 102 having a thickness less than X mm, a preferred shallow magnetic field may be produced by widths 512, depths 514, and/or widths 516 that are at a lower limit of X mm but are not less than the lower limit. That is, to produce a preferred magnetic field for a ferromagnetic workpiece 102 having a thickness of ½*X mm, the widths 512, depths 514, and/or widths 516 may be at the lower limit of X mm instead of +/−25% of ½*X mm.

If, however, the thickness of the ferromagnetic workpiece 102 is X mm or more, then the widths 512, depths 514, and/or widths 516 may approximately equal (e.g., +/−25%) the thickness of the ferromagnetic workpiece 102. Examples of a lower limit may be in the range of 0 mm to 2 mm. However, this is only an example and not meant to be limiting.

Alternatively, when a magnetic coupling device including pole plate 500 is coupling to ferromagnetic workpieces 102 having different thicknesses, a pole plate 500 having widths 512, depths 514, and/or widths 516 that is an average of the thickness of the ferromagnetic workpieces 102 may be used to reduce the need to change pole plates. Similar to above, however, a lower limit (e.g., 2.0 mm) may be applied such that if the average thickness of the ferromagnetic workpieces 102 is below the lower limit (i.e., <2.0 mm), the widths 512, depths 514, and/or widths 516 may be configured to be the lower limit (i.e., 2.0 mm).

Figure 12B:
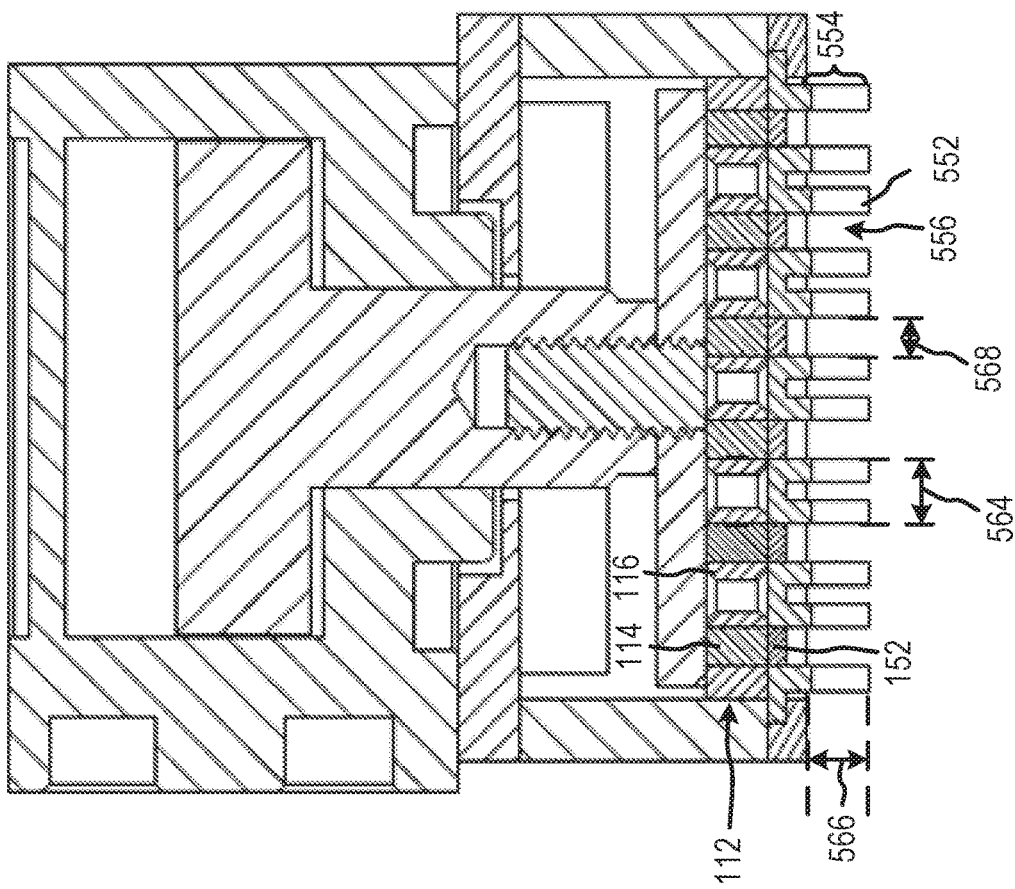
Figure 12A:
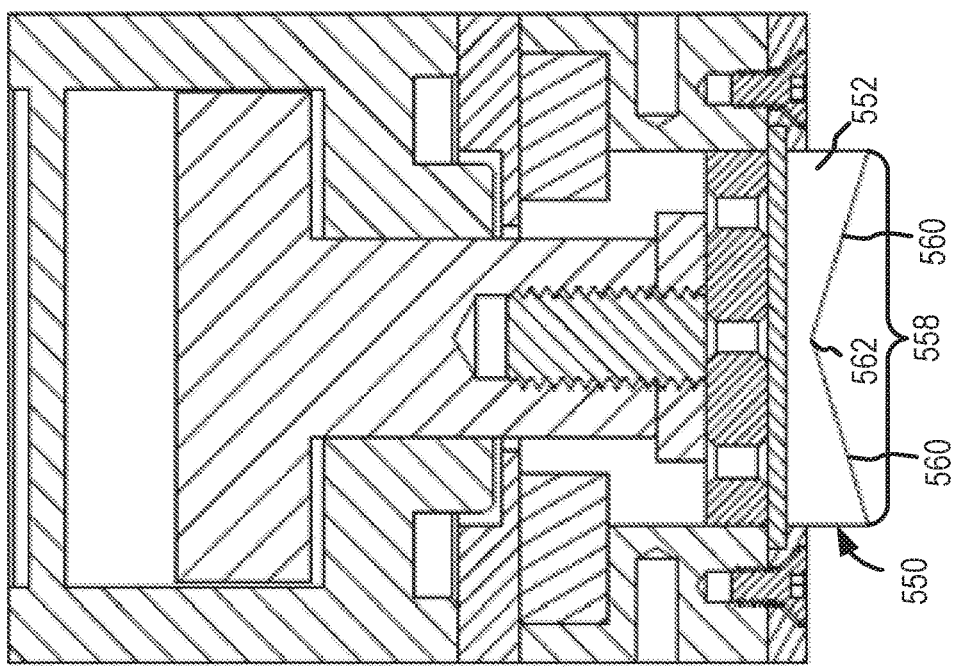

FIGS. 12A-12B depict another exemplary pole plate 550 which can be used as the pole plate 106. Similar to the pole plates 200, 300, 400, 500 depicted in FIGS. 7, 8, 10, 11A-11B, pole plate 550 includes a plurality of projections 552 arranged on a bottom portion 554 of pole plate 550. Each of projections 552 are separated by recess portions 556. The plurality of projections 552 collectively form a workpiece contact interface 558 of the pole plate 550.

As illustrated, the workpiece contact interface 558 is non-planar. In embodiments, the non-planar workpiece contact interface 558 may facilitate coupling a magnetic coupling device 100 to a ferromagnetic workpiece having a non-planar surface. For example, a magnetic coupling device including pole plate 550 may be used for coupling magnetic coupling device 100 to one or more edges, corners, etc. of a ferromagnetic workpiece. While the workpiece contact interface 558 includes two downwardly sloping surfaces 560 extending from a center point 562, the workpiece contact interface 558 may have any other type of non-planar surface. For example, the workpiece contact interface 558 may include a similar contour as a ferromagnetic piece to which the magnetic coupling device including the workpiece contact interfaces 558 is intended to couple.

Despite having a non-planar workpiece contact interface 558, varying the widths 564 of the projections 552 and/or the depths 566, and/or widths 568 of the recesses 556 result in different shallow magnetic fields produced by the same magnetic coupling device. In embodiments, to produce an appropriate shallow magnetic field for a specific ferromagnetic workpiece 102, the widths 564 of the projections 552 and/or the depths 566, and/or widths 568 of the recesses 556 could be approximately the same (e.g., +/−25%) as the thickness of the ferromagnetic workpiece 102. In at least one embodiment, however, there may be a limit for producing a preferred shallow magnetic field for some ferromagnetic workpieces 102 having thicknesses less than the limit. That is, for ferromagnetic workpieces 102 having a thickness less than X mm, a preferred shallow magnetic field may be produced by widths 564, depths 566, and/or widths 568 that are at a lower limit of X mm but are not less than the lower limit. That is, to produce a preferred magnetic field for a ferromagnetic workpiece 102 having a thickness of ½*X mm, the widths 564, depths 566, and/or widths 568 may be at the lower limit of X mm instead of +/−25% of ½*X mm. If, however, the thickness of the ferromagnetic workpiece 102 is X mm or more, then the widths 564, depths 566, and/or widths 568 may approximately equal (e.g., +/−25%) the thickness of the ferromagnetic workpiece 102. Examples of a lower limit may be in the range of 0 mm to 2 mm. However, this is only an example and not meant to be limiting.

Alternatively, when a magnetic coupling device including pole plate 550 is coupling to ferromagnetic workpieces 102 having different thicknesses, a pole plate 550 having widths 564, depths 566, and/or widths 568 that is an average of the thickness of the ferromagnetic workpieces 102 may be used to reduce the need to change pole plates. Similar to above, however, a lower limit (e.g., 2.0 mm) may be applied such that if the average thickness of the ferromagnetic workpieces 102 is below the lower limit (i.e., <2.0 mm), the widths 564, depths 566, and/or widths 568 may be configured to be the lower limit (i.e., 2.0 mm).

Figure 13:
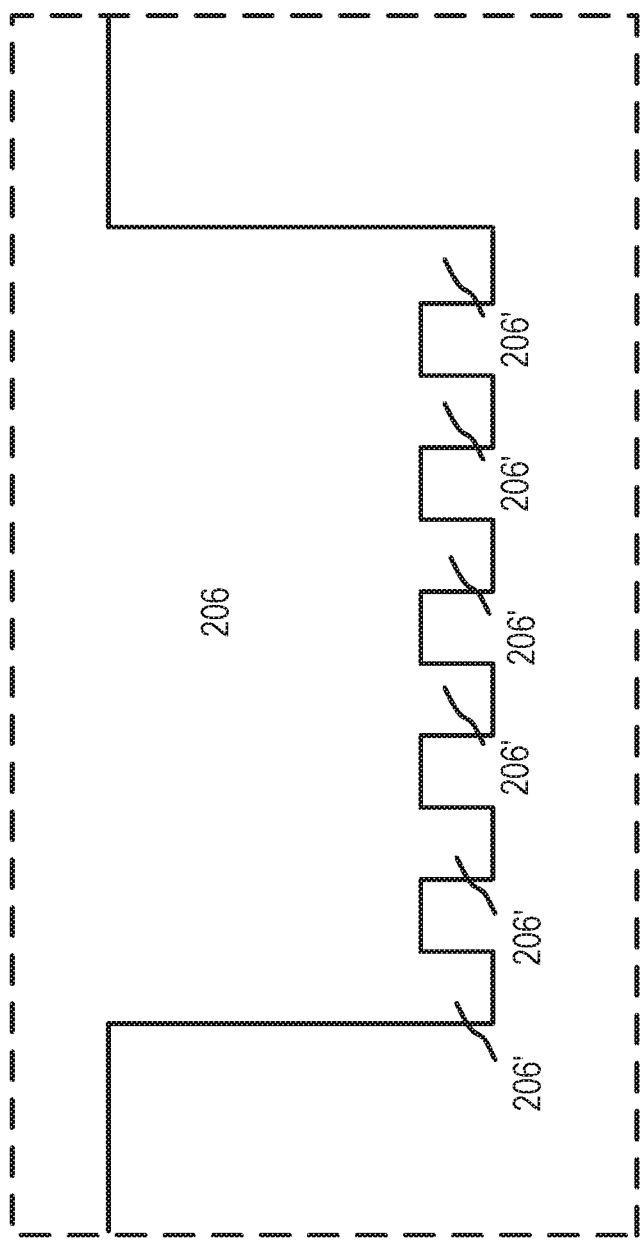

FIG. 13 is a side of a portion of an exemplary projection 206. As illustrated, each projection 206 may itself includes projections 206'. The projections 206' may further increase the shallow magnetic field and reduce the far-field magnetic field in comparison to if the projection 206 didn't include the projections 206'. In alternative embodiments, the projection 206 may not include the projections 206'.

Other characteristics of pole plates are described in U.S. Provisional Patent Application No. 62/623,407, filed Jan. 29, 2018, titled MAGNETIC LIFTING DEVICE HAVING POLE SHOES WITH SPACED APART PROJECTIONS, the entire disclosure of which are herein expressly incorporated by reference.

In view of validating the foregoing disclosure of FIGS. 7-13, the following average breakaway forces for varying types of pole plates 106 are provided in the following tables.

| Thickness of Plate (mm) | Pole Plate 1 - Average Breakaway Force (kg) | Pole Plate 2 - Average Breakaway Force (kg) | Pole Plate 3 - Average Breakaway Force (kg) |
| --- | --- | --- | --- |
| 0.5 | 15.20 | 16.13 | 17.40 |
| 0.8 | 26.80 | 26.23 | 26.47 |
| 1 | 49.07 | 46.70 | 43.20 |
| 2 | 68.57 | 65.17 | 58.00 |
| 3 | 70.47 | 68.87 | 61.93 |
| 4 | 70.47 | 69.87 | 67.60 |
| 5 | 70.33 | 69.83 | 67.73 |

Figure 14:
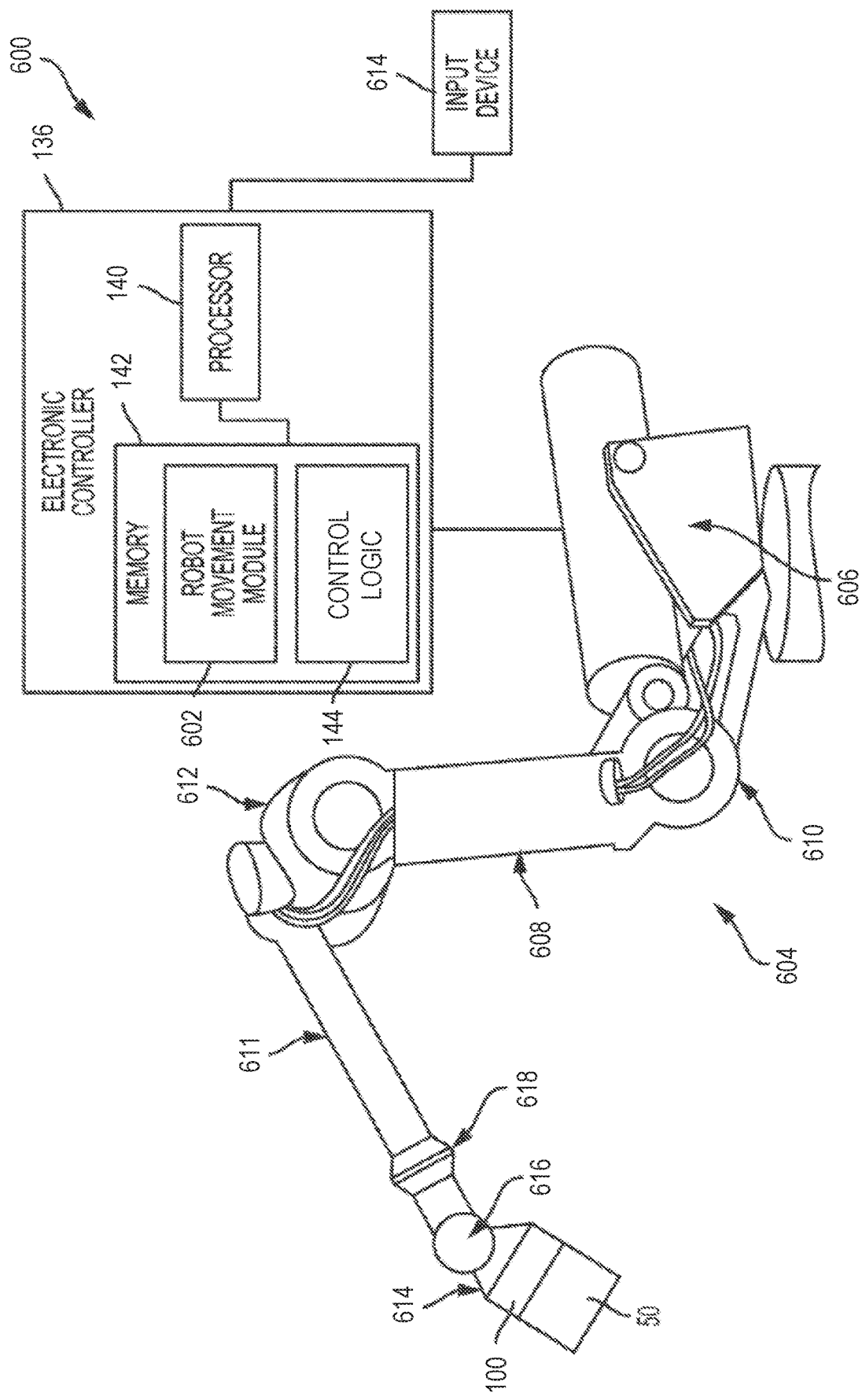
FIG. 14 illustrates a robotic system including the exemplary magnetic coupling device of FIGS. 1A-1C attached as an end of arm coupler.

Referring to FIG. 14, an exemplary robotic system 600 is illustrated. While a robotic system 600 is depicted in FIG. 14, the embodiments described in relation thereto may be applied to other types of machines, (e.g., crane hoists, pick and place machines, robotic fixtures, etc.).

Robotic system 600 includes electronic controller 136. Electronic controller 136 includes additional logic stored in associated memory 142 for execution by processor 140. A robotic movement module 602 is included which controls the movements of a robotic arm 604. In the illustrated embodiment, robotic arm 604 includes a first arm segment 606 which is rotatable relative to a base about a vertical axis. First arm segment 606 is moveably coupled to a second arm segment 608 through a first joint 610 whereat second arm segment 608 may be rotated relative to first arm segment 606 in a first direction. Second arm segment 608 is moveably coupled to a third arm segment 611 through a second joint 612 whereat third arm segment 611 may be rotated relative to second arm segment 608 in a second direction. Third arm segment 611 is moveably coupled to a fourth arm segment 614 through a third joint 616 whereat fourth arm segment 614 may be rotated relative to third arm segment 611 in a third direction and a rotary joint 618 whereby an orientation of fourth arm segment 614 relative to third arm segment 611 may be altered. Magnetic coupling device 100 is illustratively shown secured to the end of robotic arm 604. Magnetic coupling device 100 is used to couple a ferromagnetic workpiece 102 (not shown) to robotic arm 604.

In one embodiment, electronic controller 136 by processor 140 executing robotic movement module 602 moves robotic arm 604 to a first pose whereat magnetic coupling device 100 contacts the ferromagnetic workpiece 102 at a first location. Electronic controller 136 by processor 140 executing control logic 144 instructs magnetic device 100 to transition from a first, off state to a second, on state or a third, on state to couple the ferromagnetic workpiece 102 to robotic system 600. Electronic controller 136 by processor 140 executing robotic movement module 602 moves the ferromagnetic workpiece 102 from the first location to a second, desired, spaced apart location. Once the ferromagnetic workpiece 102 is at the desired second position, electronic controller 136 by processor 140 executing control logic 144 instructs magnetic coupling device 100 to transition from a second, on state to a first, off state to decouple the ferromagnetic workpiece 102 from robotic system 600. Electronic controller 136 then repeats the process to couple, move, and decouple another ferromagnetic workpiece 102.

Figure 15:
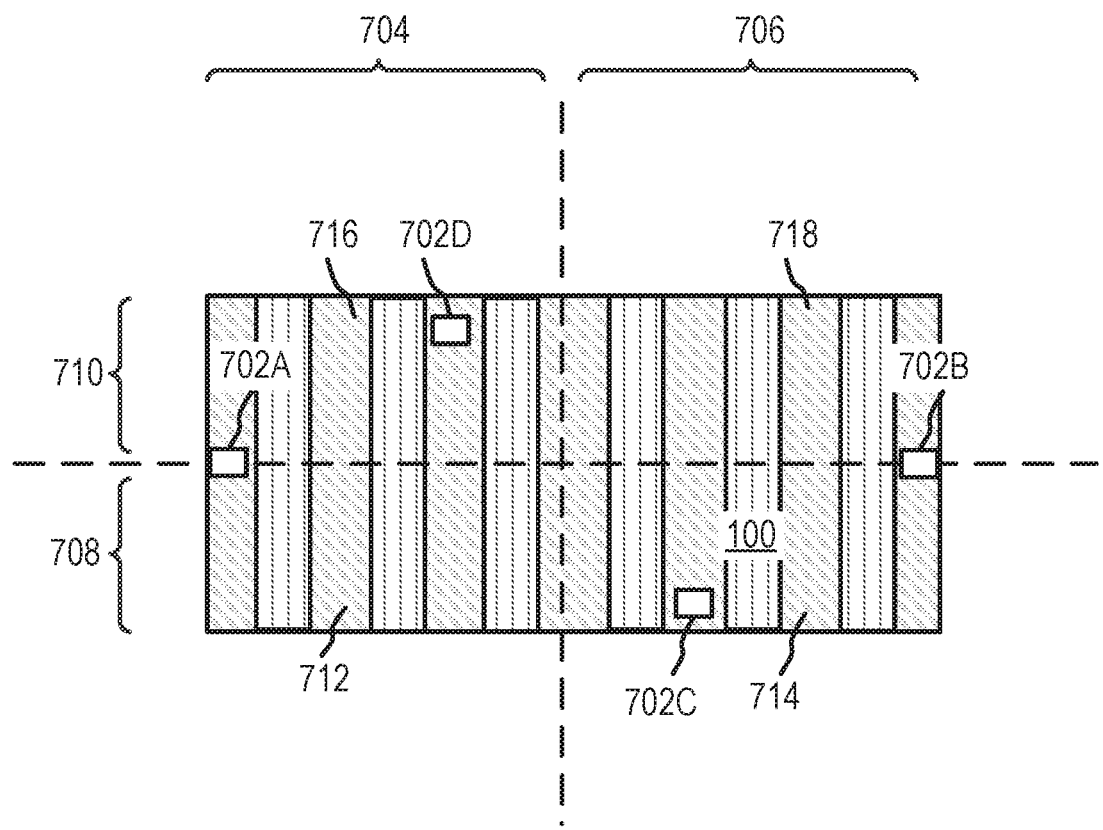
FIG. 15 illustrates a top sectional view of an exemplary sensor layout of the magnetic coupling device of FIGS. 1A-1C.

In embodiments, control logic 144 may also determine the presence, absence, or other characteristics of ferromagnetic workpieces 102 in relation to magnetic coupling device 100. To do so, magnetic coupling device 100 may include one or more magnetic field sensors. Referring to FIG. 15, a representative top sectional view of magnetic coupling device 100 including magnetic field sensors 702 is illustrated. Magnetic field sensor 702 are positioned as described herein with first magnetic field sensor 702A being positioned in a left side half 704 of the magnetic coupling device 100 and second magnetic field sensor 702B being positioned in a right-side half 706 of the magnetic coupling device 100. Additionally, a third magnetic field sensor 702C is positioned in a front half 708 of the magnetic coupling device 100 and a fourth magnetic field sensor 702D is positioned in a rear half 710 of the magnetic coupling device 100. The front half 708 including a first portion 712 of the left side half 704 and a first portion 714 of the right-side half 706. The rear half 710 including a second portion 716 of the left side half 704 and a second portion 718 of the right-side half 706. The addition of the third and fourth magnetic field sensors 702C, 702D provides additional sensor values which may be used to determine various operating states of the magnetic coupling device 100. For example, control logic 144 based on the outputs of the four magnetic field sensors may determine an orientation of the workpiece contact interface 104 relative to the ferromagnetic workpiece 102 in two rotational axes, such as left-to-right tilt and front-to-back tilt.

Turning then to functional blocks of the control logic 144. The simplest piece of information required about the magnetic coupling device 100 is that of the switching state of the magnetic coupling device 100, i.e. is the unit in a first, off state, a second, on state, or a partial on state, such as the third, on state. In the first, off state, the magnetic coupling device 100 has extremely little or even no leakage flux. In the second, on state, even on a near perfect magnetic working circuit with a ferromagnetic workpiece 102, the magnetic coupling device 100 has considerably more leakage flux than in the first, off state. Therefore, in a calibration process, the reading of one or more of the first magnetic field sensors 702 in the off state of the magnetic coupling device 100 can be stored in a memory 142 (see FIG. 15) associated with the processor 140 of the control logic 144 as a calibrated or hard coded value, and when the magnetometer reading rises above this first, off-state value, or some offset above this off-state value, the magnetic coupling device 100 can be considered in the second on state or a partial on state, such as the third, on state. When the magnetometer reading is at or close to the calibration stored value, the magnetic coupling device 100 can be considered in the first, off state. In embodiments, through a calibration process, the reading of one or more of the first magnetic field sensors 702 in a desired partial on state may be stored in memory 142 as a calibrated or hard coded value, and when the magnetometer reading rises to a specific stored reading or within some percentage of the specific stored reading, the magnetic coupling device 100 can be considered to be in the corresponding a partial on state, such as the third, on state. In some embodiments, the magnetic field sensors 702 may be supplemented with one or more positional sensors used to determine a position of magnetic platter 112 to calibrate the magnetic coupling device 100.

Figure 16:
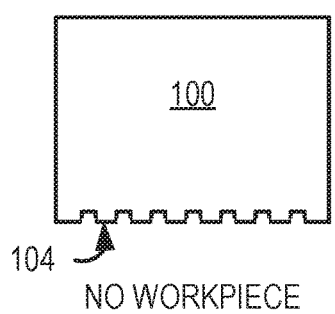
FIG. 16 illustrates a simplified front elevation view of the magnetic coupling device of FIGS. 1A-1C and no ferromagnetic workpiece in the proximity of the magnetic coupling device of FIGS. 1A-1C.

Another functional block of the control logic 144 may be used to determine if there is a ferromagnetic workpiece 102 underneath only the left side half 704, only the right-side half 706 or underneath both the left side half 704 and the right-side half 706 when the magnetic coupling device 100 is in an on state. When no target part is present for the magnetic coupling device 100 to magnetically attach to (see FIG. 16), there is no 'true' (i.e. external working) magnetic circuit through pole plate 106 (see FIG. 1B). Assuming that any workpiece 102 is sufficiently spaced apart from the pole plate 106 so as to not distort the magnetic field, the flux would extend through air between the pole portions 116 (of FIG. 1B), effectively representing leakage flux. This also causes a high leakage flux to be present at the magnetic field sensors 702. By storing this "max leakage flux" for a given second, on state or partial on state, such as the third, on state, in memory 142 associated with the processor 140 of the control logic 144, either hard coded (given that this value would be invariable), or from a calibration run, in normal operation of the magnetic coupling device 100 it is possible to determine if there is a ferromagnetic workpiece 102 present or not, by placing the magnetic coupling device 100 in the second, on state or partial on state, such as the third, on state corresponding to the stored "max leakage flux" reference value and comparing a current sensor output with the stored "max leakage flux" reference value for the on state or the partial on state.

Figure 17:
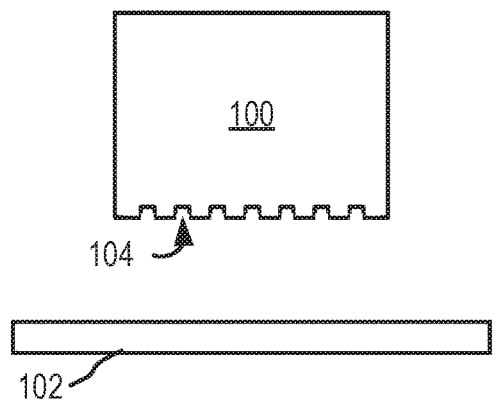
FIG. 17 illustrates a simplified front elevation view of the magnetic coupling device of FIGS. 1A-1C and a ferromagnetic workpiece separated from the magnetic coupling device by a first separation.
Figure 18:
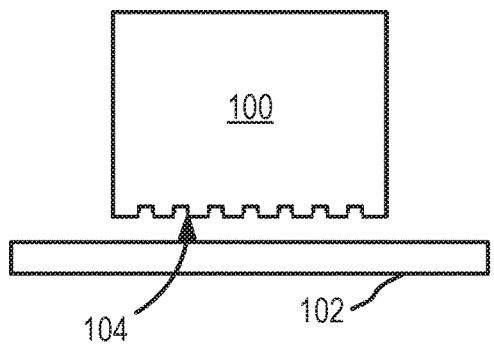
FIG. 18 illustrates a simplified front elevation view of the magnetic coupling device of FIGS. 1A-1C and a ferromagnetic workpiece separated from the magnetic coupling device.

In addition to detecting a presence or absence of workpiece 102, logic control logic 144 may also provide an indication of a spacing of the workpiece contact interface 104 from the workpiece 102 when the presence of a ferromagnetic workpiece 102 is detected (the current sensor value is below the stored "max leakage flux" for presence detection). In embodiments, control logic 144, is configured to determine if the workpiece contact interface 104 is proximate to the ferromagnetic workpiece 102. In one example, control logic 144 determines if the workpiece contact interface 104 is proximate to workpiece 102 when the current value for the corresponding sensor 702 falls below a threshold value. The threshold value may be determined and stored in memory 142 during a calibration run and may correspond to a known spacing between the workpiece contact interface 104 and the workpiece 102 (see FIG. 17). In one embodiment, a plurality of threshold values is stored on memory 142, each corresponding to a respective known spacing. The plurality of stored threshold values permits control logic 144 to provide better approximation of the spacing between the workpiece contact interface 104 and the workpiece 102 and to distinguish between a first spacing (see FIG. 17) and a second, smaller spacing (see FIG. 18). An advantage, among others is that the ability to accurately determine proximity of a workpiece allows a robotic system 600 (see FIG. 14) to move at a higher speed until magnetic coupling unit 100 is within a first spacing from workpiece 102 and thereafter move at a slower speed until contact is made with workpiece 102. In embodiments, for the various calibrations runs and values discussed herein, separate calibrations runs or values are performed for different types of ferromagnetic materials due to fact that target sensor readings may differ based on the respective size, shape, material, etc. of the target ferromagnetic workpiece.

Figure 19:
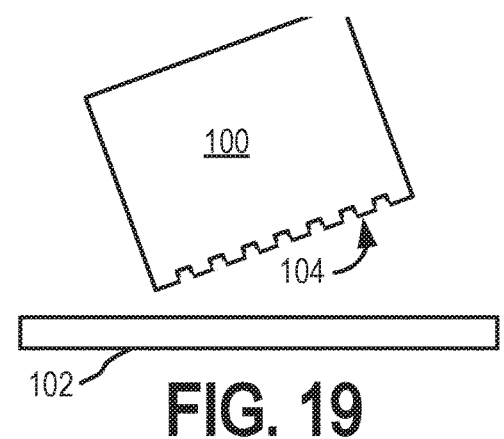
FIG. 19 illustrates a simplified front elevation view of the magnetic coupling device of FIGS. 1A-1C being tilted left-to-right relative to a ferromagnetic workpiece.
Figure 20:
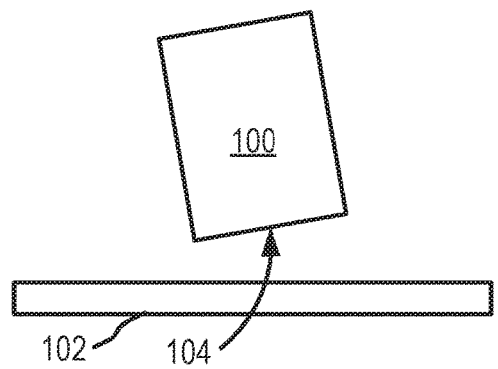
FIG. 20 illustrates a simplified front elevation view of the magnetic coupling device of FIGS. 1A-1C being tilted front-to-back relative to a ferromagnetic workpiece.

In embodiments, control logic 144 is configured to determine an orientation of the first workpiece contact interface 104 and the second workpiece contact interface 104 relative to the ferromagnetic workpiece 102. In one example, the orientation of the left side half 704 of the workpiece contact interface 104 and the right-side half 706 of the workpiece contact interface 104 relative to the ferromagnetic workpiece 102 is determined by a comparison of an output of the first magnetic field sensor 702A and an output of the second magnetic field sensor 702B. A first spacing between the left side half 704 of the workpiece contact interface 104 and the ferromagnetic workpiece 102 and a second spacing between the right side half 706 of the workpiece contact interface 104 and the ferromagnetic workpiece 102 are determined by control logic 144 to be generally equal when the output of the first magnetic field sensor 702A and the output of the second magnetic field sensor 702B satisfy a first criteria. In one example, the first criteria is that the output of the first magnetic field sensor 702A is within a threshold amount of the output of the second magnetic field sensor 702B. An example threshold amount is an absolute difference. In another example, the threshold amount is a percentage difference. When the first criteria is satisfied, the left side half 704 and the right-side half 706 of the workpiece contact interface 104 have generally equal spacing relative to the workpiece 102 (see FIG. 18). When the first criteria is not satisfied, the left side half 704 and the right-side half 706 of the workpiece contact interface 104 are angled relative to the workpiece 102 (see FIG. 19). If a third and fourth magnetic field sensor are incorporated, such as shown in FIG. 15, an angle about a pitch axis (see FIG. 20) may also be determined in addition to the angle about the roll axis depicted in FIG. 19. Additionally, or alternatively, the incorporation of a three-dimensional magnetic flux sensor may determine an angle about a pitch axis (see FIG. 20) and/or an angle about the roll axis depicted in FIG. 19.

In addition to these device status and workpiece detection capabilities, the presence and specific location of at least two magnetic field sensors 702 in the specified location on the pole plate 106, provides more advanced feedback. This is because situation-dependent, potentially uneven distribution of leakage flux around the individual pole portions 116 of the pole plate 106 can be sampled, compared and evaluated.

Figure 21:
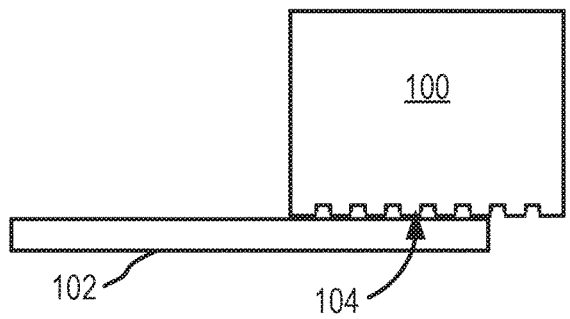
FIG. 21 illustrates a simplified front elevation view of the magnetic coupling device of FIGS. 1A-1C contacting a right edge portion of a ferromagnetic workpiece.

In embodiments, in the second, on state (equally applicable to a known partial on state) of the magnetic coupling device 100, if the left side half 704 of the workpiece contact interface 104 of the pole plate 106 has good contact with a ferromagnetic workpiece 102, but the right side half 706 of the workpiece contact interface 104 has poor contact with the workpiece 102 (see FIG. 21), there will be more leakage flux on the right side half 706 than the left side half 704. The first magnetic field sensor 702A above the left side half 704 and the second magnetic field sensor 702B above the right-side half 706 are able to detect this condition, and the sensor 702B above the right-side half 706 will return a higher reading than the sensor 702A above the left side half 704. In one example, bidirectional Hall Effect sensors are used for sensors 702. Therefore, by reading each sensor 702 separately and comparing the readings between them, control logic 144 is able to determine that the right-side half 706 has poor contact on the workpiece 102. In embodiments, the control logic 144 has a functional block to perform such evaluation, implementable in hardware and microprocessor software. In one example, control logic 144 determines the right-side half 706 has poor contact when a difference in the readings of the sensor 702A and the sensor 702B exceed a stored threshold amount. In another example, the control logic 144 determines the right-side half 706 has poor contact when a difference in the readings of the sensor 702B and a known, stored value is less than a threshold, where the known stored value may be determined during calibration of the magnetic coupling device 100.

Figure 22:
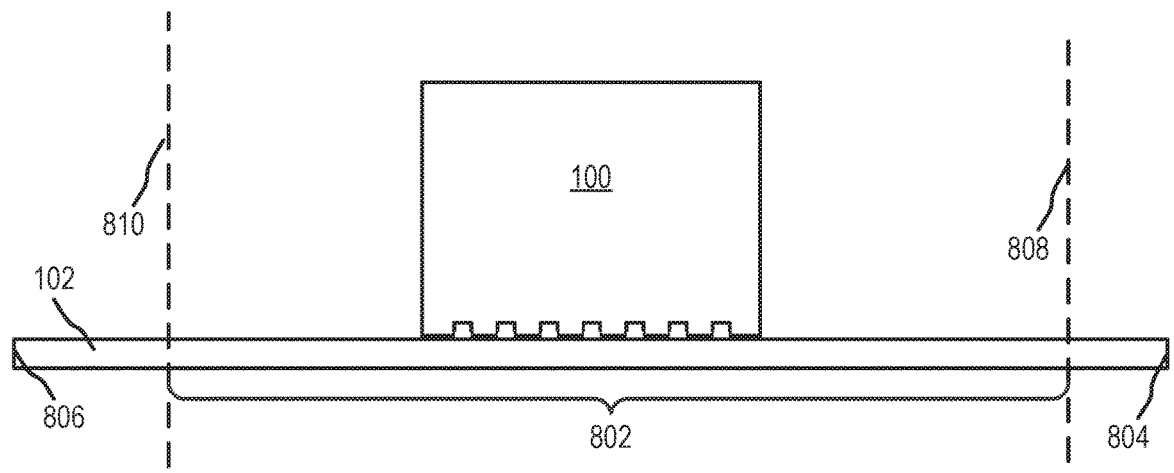
FIG. 22 illustrates a simplified front elevation view of the magnetic coupling device of FIGS. 1A-1C contacting a central portion of a ferromagnetic workpiece.
Figure 23:
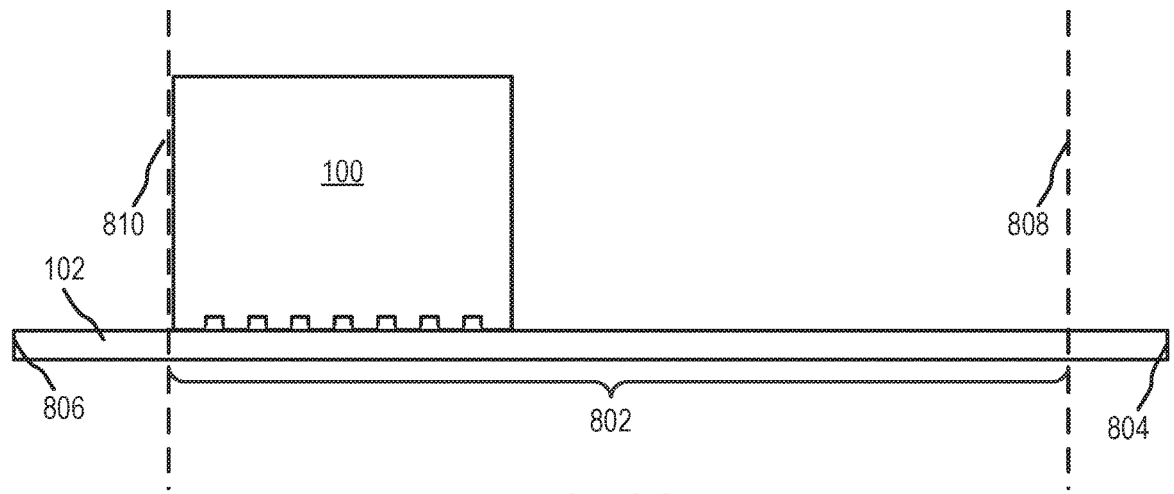
FIG. 23 illustrates a simplified front elevation view of the magnetic coupling device of FIGS. 1A-1C contacting a ferromagnetic workpiece at a first limit position.
Figure 24:
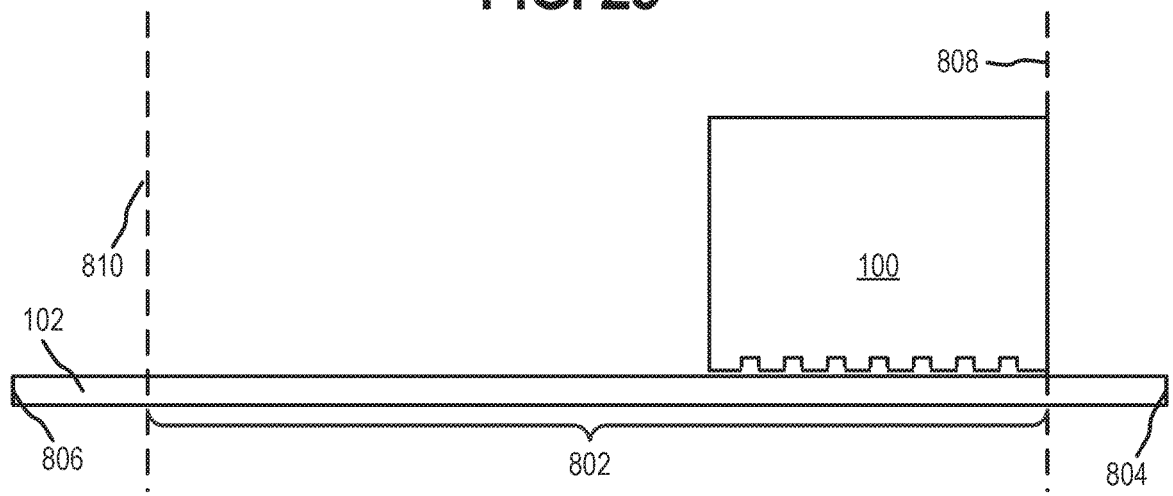
FIG. 24 illustrates a simplified front elevation view of the end of arm magnetic coupling device of FIGS. 1A-1C contacting a ferromagnetic workpiece at a second limit position.

In embodiments, control logic 144 is configured to determine if a placement of the left side half 704 of the workpiece contact interface 104 and the right-side half 706 of the workpiece contact interface 104 relative to the ferromagnetic workpiece 102 are within a target zone 802 on the ferromagnetic workpiece 102 (see FIGS. 22-24). In one example, the placement of the left side half 704 of the workpiece contact interface 104 and the right side half 706 of the workpiece contact interface 104 relative to the ferromagnetic workpiece 102 are determined by control logic 144 to be within the target zone 802 (FIGS. 22-24) of the ferromagnetic workpiece 102 when both an output of the first magnetic field sensor 702A satisfies a first criteria and an output of the second magnetic field sensor 702B satisfies a second criteria. An exemplary first criterion is that the output of the first magnetic field sensor 702A is within a first range of magnetic flux values and an exemplary second criterion is the output of the second magnetic field sensor 702B is within a second range of magnetic flux values.

Referring to FIGS. 22-24, target zone 802 is illustrated. Workpiece 102 is illustrated as a sheet of material having a right end 804 and a left end 806. Target zone 802 is the portion of workpiece 102 between a first offset 808 from the right end 804 of workpiece 102 and a second offset 810 from the left end 806 of workpiece 102. In one example, as magnetic coupling device 100 approaches and/or exceeds second offset 810, the leakage flux associated with the left side half 704 of the workpiece contact interface 104 is higher than the leakage flux associated with the right side half 706 of the workpiece contact interface 104 due to the left side half 704 of the workpiece contact interface 104 approaching left end 806 of workpiece 102. In similar fashion, as device 100 approaches and/or exceeds first offset 808, the leakage flux associated with the ride side half 706 of the workpiece contact interface 104 is higher than the leakage flux associated with the left side half 704 of the workpiece contact interface 104 due to the right side half 706 of the workpiece contact interface 104 approaching right end 804 of workpiece 102. Although shown as a linear target zone 802, a two-dimensional target zone 802 may be defined for a length and a width of ferromagnetic workpiece 102. In one example a calibration run is executed wherein device 100 is placed at each of first limit 808 (see FIG. 24) and second limit 810 (see FIG. 23) and the corresponding leakage flux values for the magnetic flux sensors 702A, 702B at both limits are stored in memory 142. The two leakage flux values stored for the first limit position (see FIG. 24) are stored in memory 142 as "Limiting Position 1" (two values, one for each sensor 702A, 702B). The two leakage flux values stored for the second limit position (see FIG. 23) are stored in memory 142 as "Limiting Position 2" (two values, one for each sensor 702A, 702B). In embodiments, the first range of the first criteria are the values between and including Limiting Position 1 and Limiting Position 2 for one of the magnetic field sensors 702A, 702B and the second range of the second criteria are the values between and including Limiting Position 1 and Limiting Position 2 for the other of the magnetic field sensors 702A, 702B. Assuming the first range of values correspond to the left side half 704 of the workpiece contact interface 104 and the second range of values correspond to the right side half 706 of the workpiece contact interface 104, control logic 144 determines that a left end of the magnetic coupling device 100 is positioned outside of the target zone 802 when the second criteria is satisfied and the first criteria is not satisfied and likewise that a right end of the magnetic coupling device 100 is positioned outside of the target zone 802 when the first criteria is satisfied and the second criteria is not satisfied.

In embodiments, using (storing) 'Limiting Position 1' and Limiting Position 2' calibrated values on memory 142 allows a device user to calibrate the ferromagnetic workpiece 102 present signal to only come on when a specific magnetic work circuit is formed (if calibrated as the same position) or within a range of magnetic working circuits (if calibrated as 2 different positions). The left side half 704 and the right-side half 706 of the workpiece contact interface 104 can either be the equivalent of the "max leakage" position of Limiting Position ½ or it can be outside of that in a greater leakage position. These calibrations are what allow for so called double blank detection (DBD) and part specific or range specific confirmation. The freedom for the left side half 704 and the right-side half 706 of the workpiece contact interface 104 to be outside of the limiting positions is intended to give the user more freedom, especially if they are landing near edges on thinner steel sheets.

In embodiments, it is also possible to use this multisensory approach to provide additional device status data. In the above situation, beyond just comparing the two sensor readings to determine a general state of the magnetic coupling device 100 and the presence or absence of a ferromagnetic workpiece 104 in proximity of the workpiece contact interface 104, by taking more differentiated and precise magnetic field measurements from each sensor 702 when in closer proximity to the ferromagnetic workpiece 102 (i.e. presence already detected, but proximity not yet quantified) and performing calculations on the value of each sensor's 702 signal and the value of the difference between the magnetometer readings, one can determine the orientation of the magnetic coupling device 100 relative to the ferromagnetic workpiece 102, such as what angle a magnet gripper including the device 100 is sitting relative to a flat ferromagnetic workpiece 102.

Taking this even further, using calibration runs of magnetic coupling device 100 with respect to a predefined ferromagnetic workpiece 102 having known parameters (size, shape, material, etc.) and by storing into memory 142 of the evaluation circuit data obtained from processing of sensor 702 output signals during the various calibration runs, it is possible to completely determine the orientation and distance to a ferromagnetic workpiece 102 target surface relative to the magnetic coupling device 100 position, even before the workpiece contact interface 104 contacts the ferromagnetic workpiece 102, in particular if additional magnetic field sensors are placed in locations other than the ones previously specified, such as shown in FIG. 15. As the magnetic coupling device 100 emits leakage flux in any state, even the off state, very sensitive sensors can respond to small variations in the leakage flux emanating from the pole plate 106 at the sensor detection surfaces in the off state. When a magnetic coupling device 100 in the off state or a known partial on state approaches a ferromagnetic workpiece 102, then, adequately sensitive magnetometers can indicate proximity to component, and can deliver signals which are converted into control signals for the robotic arm 600 in acting as a sort of "vision" for an otherwise blind robot. As another example, adequately sensitive magnetometers can assist a robotic arm 600 that can only determine its two-dimensional position by determining a distance between the magnetic coupling device 100 and the ferromagnetic workpiece 102 (e.g., a depth between the two). Therefore, the robotic arm 600 may be programmed to decelerate (e.g., linearly or non-linearly) as the magnetic coupling device 100 approaches the ferromagnetic workpiece 102 to avoid a collision.

For example, assuming that a total of four magnetometers are present, one at the flux detection surface of the left half side 704 of the workpiece contact interface 104 and one at the flux detection surface of the right half side 706 of the workpiece contact interface 104, as previously noted, and two additional sensors at other locations, such as shown in FIG. 15, when moving the magnetic coupling device 100 towards the ferromagnetic workpiece 102 with one of the sensors 702 moving closer (in absolute terms) than the others, leakage flux lines near that sensor 702 would increase in density, focusing themselves toward the ferromagnetic workpiece 102. In bringing the magnetic coupling device 100 even closer to the ferromagnetic workpiece 102 (without changing spatial attitude and translational direction of the magnetic coupling device 100 coupled to the end of the arm of the robot 600, the flux lines would redistribute more intensely across the magnetic coupling device 100, with the density of flux lines on the nearest sensor 702 being inversely proportional to the distance between the sensor 702 and the ferromagnetic workpiece 102. This produces an even higher reading in the magnetometer over the close-proximity sensor 702. By comparing the close proximity magnetometer output to the signal output from the other 3 magnetometers, and by evaluating the data one can tell where and how close the ferromagnetic workpiece 102 is to the working faces of the magnetic coupling device 100, given the known spatial relationships between the sensors 702 and the working face of the workpiece contact interface 104. As another example, one or more three-dimensional magnetometers could be used to determine how close the ferromagnetic workpiece 102 is to the working faces of the magnetic coupling device 100.

In performing accurate calculations on the outputs of the magnetometers of the magnetic coupling device 100, other functionalities can be enabled when the magnetic flux source is switched on and contact is established with the ferromagnetic workpiece 102. There is a direct relationship between the amount of magnetic flux in a working magnetic circuit, and the amount of physical force that the working magnetic circuit can withstand, which in the case of a magnetic coupling device 100 corresponds to the device's 100 payload. As the leakage flux from a permanent magnet depends on how much of the magnetic flux is 'consumed' (i.e. bound) in the primary working circuit, there is a correlation between the leakage flux and the maximum payload that can be sustained by the magnetic coupling device 100. The processor 140 of the control logic 144 is programmed, in one embodiment, with the appropriate formulae and calibration runs can be performed such that the combined readings of the magnetometers on the magnetic coupling device 100 can be used to derive a more exact holding force of the magnetic coupling device 100 than with known devices. This could be used as (i) a "safety check," to make sure that the magnetic coupling device 100 is able to lift the ferromagnetic workpiece 102 before being moved by the robot 600, (ii) the magnetic coupling device 100 is operating at full capacity, and/or (iii) the magnetic coupling device 100 is operating has not been damaged or degraded. Additionally or alternatively, these methods may be used for part specific detection, and/or detection of a range of thicknesses of ferromagnetic workpieces 102.

In all of these situations, the processor 140 of the control logic 144 is responsible for accepting input from each of the magnetometers 702 of the magnetic coupling device 100 and performing calculations and comparisons. The processor 140 then determines various device states based upon the calculations. In embodiments, device 100 communicates the determined device states and feedback points to a robot controller (e.g., 136 of FIG. 14). This is handled by either the 24V I/O or a communications module (not shown). Once the feedback has been communicated to the robot controller 136, the robot controller 136 is then able to adjust an orientation of device 100 and operation to address challenges or issues in operation.

It will be appreciated that the control logic 144 comprises the required components to perform isolation, filtering and amplification of signals provided by the sensors for processing by the on-board processor 140 of the magnetic coupling device 100.

Additional details and embodiments about sensing capabilities and sensor arrangements that may be incorporated into magnetic coupling device 100 are disclosed in PCT Patent Application No. PCT/US18/29786, filed Apr. 27, 2018, titled MAGNETIC COUPLING DEVICE WITH AT LEAST ONE OF A SENSOR ARRANGEMENT AND A DEGAUSS CAPABILITY, the entire disclosure of which are herein expressly incorporated by reference.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A magnetic coupling device for magnetic coupling to a ferromagnetic workpiece, comprising:
    a housing having an axis extending between a first end portion of the housing and a second end portion of the housing;
    a brake supported by the housing;
    a ferrous piece arranged at least a first distance from the second end portion of the housing;
    a magnetic platter supported by the housing, the magnetic platter including a plurality of permanent magnet portions interposed between a plurality of ferromagnetic pole piece portions; and wherein the magnetic platter is linearly translatable within the housing along the axis to at least each of a first state and a second state, the magnetic platter being arranged adjacent to the ferrous piece such that the magnetic coupling device establishes a first magnetic circuit through the ferrous piece and provides a first magnetic field at a workpiece contact interface of the magnetic coupling device when the magnetic platter is in the first state and the magnetic platter being arranged spaced apart from the ferrous piece such that the magnetic coupling device provides a second magnetic field at the workpiece contact interface when the magnetic platter is in the second state, the second magnetic field being a non-zero magnetic field strength; and wherein the magnetic coupling device is linearly translatable to a third state, the magnetic platter being arranged between the first state and the second state when the magnetic platter is in the third state and the brake is configured to releasably hold the magnetic platter in the third state.

2. The magnetic coupling device of claim 1, further comprising at least one non-ferromagnetic piece arranged at least a second distance from the second end portion of the housing.

3. The magnetic coupling device of claim 1, wherein the magnetic platter translates a distance of less than or equal to 8 mm.

4. The magnetic coupling device of claim 1, wherein the magnetic coupling device provides a holding force greater than or equal to 0.25 grams per cubic mm of magnetic coupling device.

5. The magnetic coupling device of claim 1, wherein the magnetic coupling device provides a holding force greater than or equal to 0.35 grams per cubic mm of the magnetic platter.

6. The magnetic coupling device of claim 1, wherein the magnetic coupling device provides a holding force greater than or equal to 0.15 grams per square mm of the workpiece contact interface.

7. The magnetic coupling device of claim 1, wherein the workpiece contact interface comprises a plurality of spaced-apart projections.

8. The magnetic coupling device of claim 7, wherein the workpiece contact interface is releasably supported by the housing.

9. The magnetic coupling device of claim 1, wherein the magnetic platter is releasably supported by the housing.

10. The magnetic coupling device of claim 1, wherein the workpiece contact interface has a quadrilateral footprint.

11. The magnetic coupling device of claim 10, wherein the quadrilateral footprint is a rectangular footprint or a square footprint.

12. The magnetic coupling device of claim 1, further comprising a sensing system supported by the housing, the sensing system including at least one sensor which monitors a level of magnetic flux available to the ferromagnetic workpiece at the workpiece contact interface.

13. The magnetic coupling device of claim 1, further comprising an actuator configured to linearly translate the magnetic platter between the first state and the second state.

14. The magnetic coupling device of claim 13, wherein the actuator is at least one of: a pneumatic actuator, a hydraulic actuator, and an electrical actuator.

15. The magnetic coupling device of claim 1, wherein the ferrous piece spans multiple pole piece portions and/or multiple permanent magnet portions.

16. A method of coupling and decoupling the magnetic coupling device of claim 1 to the ferromagnetic workpiece, the method comprising the steps of:
contacting the ferromagnetic workpiece with the workpiece contact interface of the magnetic coupling device;
moving the magnetic platter of the magnetic coupling device from a first separation from the workpiece engagement surface to a second separation from the workpiece engagement surface that is less than the first separation;
moving the workpiece from a first position to a second position with the magnetic coupler; and
moving the magnetic platter to a third separation from the workpiece engagement surface to decouple the magnetic coupler from the workpiece and to form a magnetic circuit through the ferrous piece within the housing, the third separation being greater than the second separation.

17. A magnetic coupling device for magnetic coupling to a ferromagnetic workpiece, comprising:
a housing having a passageway defining a passageway axis;
a brake supported by the housing;
a magnetic platter supported by the housing, the magnetic platter being moveable along the passageway axis between a first position and a second position, the magnetic platter including a plurality of permanent magnet portions interposed between a plurality of ferromagnetic pole piece portions, the magnetic platter moveable to a third position intermediate the first position and the second position, the brake operable to releasably hold the magnetic platter in the third position;
a workpiece contact interface supported by the housing and adapted to contact the ferromagnetic workpiece; and
a magnetic shunt supported by the housing and magnetically accessible from the passageway, wherein with the magnetic platter is in the first position a first magnetic circuit is formed with the magnetic platter and the magnetic shunt and with the magnetic platter in the second position a second magnetic circuit is formed with the magnetic platter and the ferromagnetic workpiece through the workpiece interface.

18. The magnetic coupling device of claim 14, further comprising a sensor which monitors a position of the actuator.

19. The magnetic coupling device of claim 1, wherein the ferrous piece is spaced apart from the workpiece contact interface in both the first state of the magnetic coupling device and the second state of the magnetic coupling device.

20. The magnetic coupling device of claim 1, wherein the ferrous piece is positioned within the housing.

21. The magnetic coupling device of claim 1, wherein the ferrous piece extends vertically, a lower edge of the magnetic platter being above a lower edge of the ferrous piece in the first state and the lower edge of the magnetic platter being below the lower edge of the ferrous piece in the second state.

22. A magnetic coupling device for magnetic coupling to a ferromagnetic workpiece, comprising:
a housing having a passageway defining a passageway axis;
a brake supported by the housing;
a plurality of projections, each of the plurality of projections being received within the housing and having a surface exposed along a lower end of the housing to form a workpiece contact interface adapted to contact the ferromagnetic workpiece;
a magnetic platter supported by the housing, the magnetic platter is linearly translatable within the housing along the passageway axis between a first position and a second position, the magnetic platter including a plurality of permanent magnet portions interposed between a plurality of ferromagnetic pole piece portions; and wherein the magnetic platter is linearly translatable within the housing along the axis to at least each of a first state, a second state, and a third state intermediate the first state and second state, the brake configured to releasably hold the magnetic platter in the third state;

in the first state the plurality of ferromagnetic pole piece portions are offset vertically from the plurality of projections with a first one of the plurality of ferromagnetic pole piece portions of the magnetic platter positioned vertically over a first one of the plurality of projections, a second one of the plurality of ferromagnetic pole piece portions of the magnetic platter positioned vertically over a second one of the plurality of projections and completely horizontally offset relative to the first one of the plurality of projections, and a third one of the plurality of ferromagnetic pole piece portions of the magnetic platter positioned vertically over a third one of the plurality of projections and completely horizontally offset relative to the second one of the plurality of projections, and in the second state the plurality of ferromagnetic pole piece portions contact the plurality of projections with the first one of the plurality of ferromagnetic pole piece portions of the magnetic platter positioned vertically over the first one of the plurality of projections and contacting the first one of the plurality of projections, the second one of the plurality of ferromagnetic pole piece portions of the magnetic platter positioned vertically over the second one of the plurality of projections and contacting the second one of the plurality of projections, and the third one of the plurality of ferromagnetic pole piece portions of the magnetic platter positioned vertically over the third one of the plurality of projections and contacting the third one of the plurality of projections and completely to the first side of the first of the plurality of projections, wherein the magnetic coupling device provides a first magnetic field at the workpiece contact interface of the magnetic coupling device when the magnetic platter is in the first state and the magnetic coupling device provides a second magnetic field at the workpiece contact interface when the magnetic platter is in the second state, the second magnetic field being a non-zero magnetic field strength and greater than the first magnetic field of the first state.

23. The magnetic coupling device of claim 22, wherein the plurality of permanent magnet portions and the plurality of ferromagnetic pole piece portions of the magnetic platter form a linear array.

24. The magnetic coupling device of claim 22, further comprising an actuator configured to linearly translate the magnetic platter between the first state and the second state.

25. The magnetic coupling device of claim 24, wherein the actuator is at least one of: a pneumatic actuator, a hydraulic actuator, and an electrical actuator.

26. The magnetic coupling device of claim 25, further comprising a sensor which monitors a position of the actuator.

27. The magnetic coupling device of claim 22, wherein a lower surface of the first one of the plurality of ferromagnetic pole piece portions of the magnetic platter matches an upper surface the first one of the plurality of projections, a lower surface of the second one of the plurality of ferromagnetic pole piece portions of the magnetic platter matches an upper surface the second one of the plurality of projections, and a lower surface of the third one of the plurality of ferromagnetic pole piece portions of the magnetic platter matches an upper surface the third one of the plurality of projections.

* * * * *